United States Patent
Akiyama

(10) Patent No.: US 7,884,971 B2
(45) Date of Patent: Feb. 8, 2011

(54) MULTIPLIED PULSE GENERATION DEVICE, MULTIPLIED PULSE GENERATION METHOD, IMAGE FORMING APPARATUS, AND IMAGE READING APPARATUS

(75) Inventor: Shigeki Akiyama, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 801 days.

(21) Appl. No.: 11/863,049

(22) Filed: Sep. 27, 2007

(65) Prior Publication Data
US 2008/0080013 A1 Apr. 3, 2008

(30) Foreign Application Priority Data
Oct. 3, 2006 (JP) .............................. 2006-271791

(51) Int. Cl.
H04N 1/36 (2006.01)
G08C 19/16 (2006.01)

(52) U.S. Cl. .................................. 358/410; 340/870.24

(58) Field of Classification Search ............ 340/870.24; 358/410, 3.26, 3.27, 530, 426.02, 443, 471; 702/69, 66; 369/59.1; 375/260
See application file for complete search history.

(56) References Cited

U.S. PATENT DOCUMENTS

| 2003/0058951 A1* | 3/2003 | Thomson et al. ............. 375/260 |
| 2003/0139152 A1* | 7/2003 | Doi et al. ..................... 455/101 |
| 2004/0114696 A1* | 6/2004 | Kwon et al. ................. 375/348 |
| 2004/0136605 A1* | 7/2004 | Seger et al. ................. 382/274 |
| 2008/0147340 A1* | 6/2008 | Gebara et al. ................. 702/69 |

FOREIGN PATENT DOCUMENTS

JP 2003-072177 A 3/2003

* cited by examiner

Primary Examiner—Jerome Grant, II
(74) Attorney, Agent, or Firm—Baker Botts L.L.P.

(57) ABSTRACT

In a multiplied pulse generation device, a detection signal is outputted every time a driven object is driven by a specific amount. An actual cycle indicating a time interval between the detection signal and a previous detection signal is measured. An estimated cycle is estimated based on at least past two actual cycles including the actual cycle measured. A multiplied pulse is sequentially generated in such a manner that a multiplied cycle indicating a time interval per which the multiplied pulse is generated is sequentially changed according to an amount of change from the actual cycle to the estimated cycle.

19 Claims, 15 Drawing Sheets

ACTUAL EXAMPLE OF MULTIPLIED PULSE (WHEN R=4)

ACTUAL EXAMPLE OF MULTIPLIED PULSE (WHEN R=4)

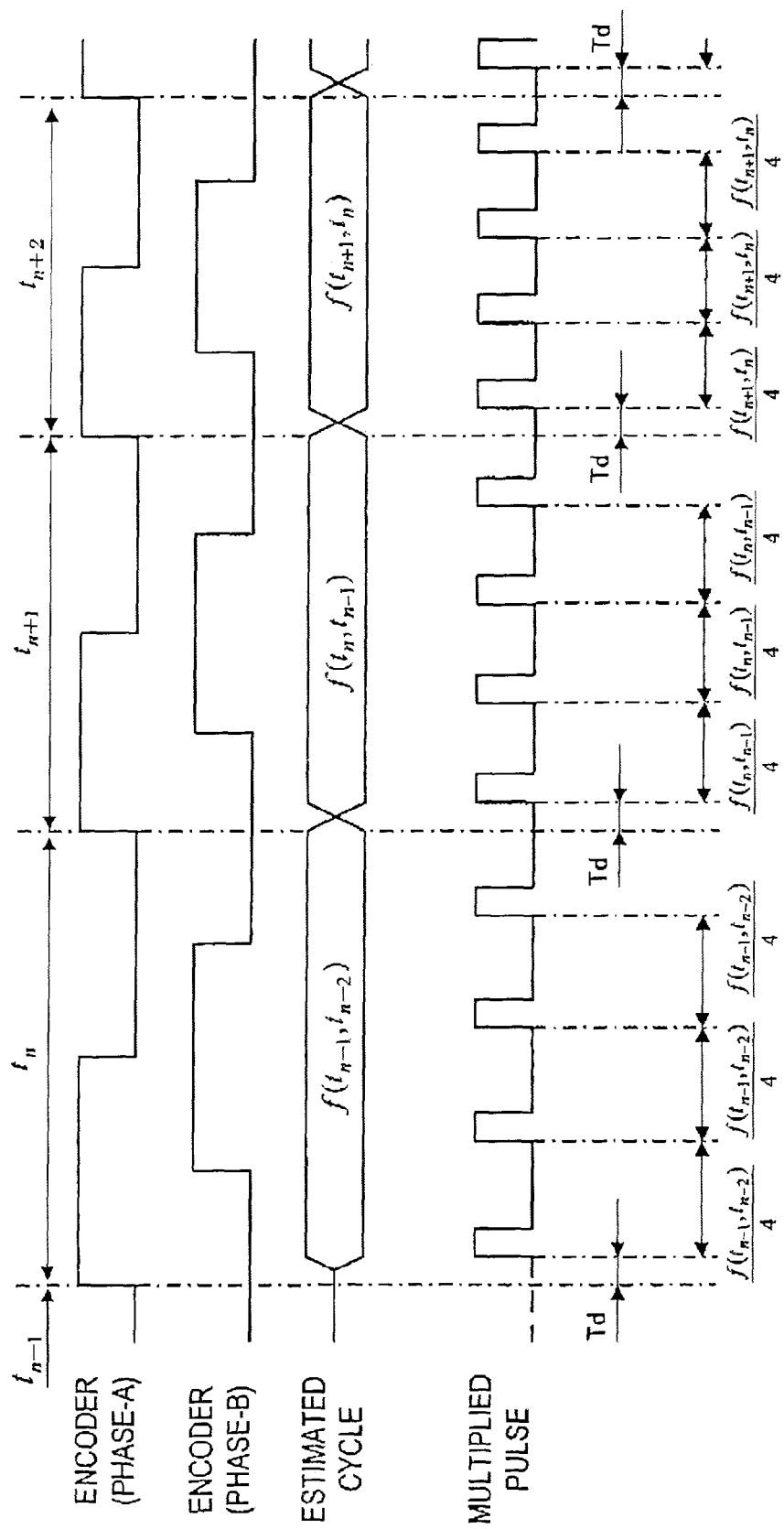

MULTIPLIED PULSE GENERATION DEVICE, MULTIPLIED PULSE GENERATION METHOD, IMAGE FORMING APPARATUS, AND IMAGE READING APPARATUS

CROSS-REFERENCE TO RELATED APPLICATIONS

This application claims the benefit of Japanese Patent Application No. 2006-271791 filed Oct. 3, 2006 in the Japan Patent Office, the disclosure of which is incorporated herein by reference.

BACKGROUND

This invention relates to a multiplied pulse generation device and a multiplied pulse generation method that generates a multiplied pulse obtained by multiplying a detection signal outputted per specific driven amount of a driven object. This invention also relates to an image forming apparatus and an image reading apparatus, each of which is provided with the multiplied pulse generation device mounted thereon.

A conventional ink-jet printer forms an image, for example, by ejecting ink onto a recording medium such as a sheet, an OHP sheet and a post card while reciprocating a carriage in a main scanning direction. A recording head is mounted on the carriage. In such ink-jet printer, a detection signal (pulse signal) from an encoder is used to determine ejection timing of ink from the recording head. The encoder detects a travel distance of the carriage, and outputs a pulse signal every time the carriage travels a predetermined distance.

Also, for example, an image reading scanner reads an image on a document while moving an image sensor along the document. A pulse signal from an encoder is used to determine timing to read. The encoder detects a travel distance of the image sensor, and outputs a pulse signal every time the image sensor travels a predetermined distance.

In recent years, resolution for the aforementioned image recording or image reading tends to become high. However, there is a practical limit in achieving required resolution for image recording or image reading by increasing physical resolution of the encoder, due to manufacturing and cost problems of the encoder.

For the purpose of obtaining higher resolution than physical resolution of the encoder, a known method multiplies a pulse signal from the encoder to generate a multiplied pulse. Here, the term "multiply" means to multiply the frequency of the pulse signal from the encoder by N (N: natural number). The number N is called a multiplication factor.

This known multiplied pulse generation method will be particularly explained by way of FIG. 17. In FIG. 17, the encoder outputs two types of signals, pulse-A and pulse-B signals, of which phases are shifted from each other. Multiplied pulses are generated per leading edge detection of the pulse-A signal from the encoder. This method estimates, per leading edge detection, a time interval until occurrence of a next leading encoder edge, based on the last time interval between encoder edges and the second to last time interval between encoder edges. Estimation can be made, for example, by calculating a prepared estimate equation. In FIG. 17, $f(\alpha, \beta)$ indicates an estimated cycle obtained by the estimate equation where the last time interval is $\alpha$ and the second to last time interval is $\beta$. For example, $f(t_n, t_{n-1})$ indicates an estimated cycle obtained by calculating the estimate equation based on the last time interval $t_n$ and the second to last time interval $t_{n-1}$. In this multiplied pulse generation method, the estimated cycle can be obtained by calculating $2B-A$ or $2B-(A+H)$ where B is the last time interval, A is the second to last time interval, and H is a correction value.

The obtained estimated cycle is divided by a multiplication factor to calculate an interval (multiplied pulse cycle) between multiplied pulses. The multiplied pulse is sequentially outputted in accordance with the calculated multiplied pulse cycle. FIG. 17 shows an example of generation of pulses multiplied by four-times. Td is the time required for various calculations from appearance of a leading edge of the phase-A signal until output of a multiplied pulse. Td is as small as can be ignored in practice in comparison with the time interval between encoder edges.

Other than the method shown in FIG. 17, there is a method of obtaining a multiplied pulse cycle simply by equally dividing the last time interval between encoder edges by a multiplication factor.

The multiplied pulses generated by the aforementioned method are updated every time an encoder edge is detected. However, the cycles of the multiplied pulses multiplied by the predetermined multiplication factor are constant between encoder edges. That is, although the method shown in FIG. 17 estimates the estimated cycle based on the past actual time intervals between encoder edges, the generated multiplied pulse merely divides the estimated cycle according to the multiplication factor. The cycles of the generated multiplied pulses are constant.

Accordingly, there is a problem in which visible discontinuities occur in consistent with encoder periods, depending on the rate of change of driving velocity of an actual driven object, the resolution of the encoder, and the multiplication factor. That is, the cycles of the multiplied pulses are discontinuously changed at encoder edges. Such discontinuous changes appear, for example, as streaky-spot patterns in the results of image recording and image reading.

SUMMARY

It would be desirable to generate highly reliable multiplied pulses in which discontinuities in cycles of the multiplied pulses are controlled before and after detection of a specific amount of drive of a driven object.

One aspect of the present invention may provide a multiplied pulse generation device. The multiplied pulse generation device includes a detection signal output unit, an actual cycle measurement unit, an estimation unit, and a multiplied pulse generation unit.

The detection signal output unit outputs a detection signal every time a driven object is driven by a specific amount. The actual cycle measurement unit measures an actual cycle indicating a time interval between the detection signal a previous detection signal every time the detection signal is outputted from the detection signal output unit. The estimation unit estimates an estimated cycle indicating a time interval until output of a next detection signal from the detection signal output unit based on at least past two actual cycles every time the detection signal is outputted from the detection signal output unit. The at least past two actual cycles includes the actual cycle measured by the actual cycle measurement unit as a result of output of the detection signal. The multiplied pulse generation unit sequentially generates a multiplied pulse obtained by multiplying the detection signal outputted, by a predetermined multiplication factor, every time the detection signal is outputted from the detection signal output unit.

The multiplied pulse generation unit may sequentially generate a multiplied pulse based on the actual cycle measured by the actual cycle measurement unit and the estimated cycle estimated by the estimation unit every time the detection signal is outputted from the detection signal output unit.

Particularly, the multiplied pulse generation unit may sequentially generate the multiplied pulse in such a manner that a multiplied cycle indicating a time interval per which the multiplied pulse is generated is sequentially changed according to an amount of change from the actual cycle measured, to the estimated cycle (i.e., according to how or how far the actual cycle has been changed as compared to the estimated cycle).

Alternatively, the multiplied pulse generation unit may sequentially generate the multiplied pulse in such a manner that a multiplied cycle indicating a time interval per which the multiplied pulse is generated is gradually changed from a multiplied cycle of a last multiplied pulse generated based on the previous detection signal to a multiplied cycle of a last multiplied pulse to be generated this time, and that a sum of multiplied cycles of multiplied pulses to be generated is consistent with the estimated cycle.

Another aspect of the present invention may provide a multiplied pulse generation method. The multiplied pulse generation method may include a detection signal output step, an actual cycle measurement step, estimation step, and a multiplied pulse generation step.

In the detection signal output step, a detection signal is outputted every time a driven object is driven by a specific amount. In the actual cycle measurement step, an actual cycle indicating a time interval between the detection signal and a previous detection signal is measured every time the detection signal is outputted. In the estimation step, an estimated cycle indicating a time interval until output of a next detection signal is estimated based on at least past two actual cycles every time the detection signal is outputted. The at least past two actual cycles includes the actual cycle measured as a result of output of the detection signal. In the multiplied pulse generation step, a multiplied pulse obtained by multiplying the detection signal outputted, by a predetermined multiplication factor, is sequentially generated every time the detection signal is outputted.

In the multiplied pulse generation step, the multiplied pulse may be sequentially generated based on the actual cycle measured and the estimated cycle estimated.

Particularly, the multiplied pulse may be sequentially generated in such a manner that a multiplied cycle indicating a time interval per which the multiplied pulse is generated is sequentially changed according to an amount of change from the actual cycle to the estimated cycle.

Alternatively, the multiplied pulse may be sequentially generated in such a manner that a multiplied cycle indicating a time interval per which the multiplied pulse is generated is gradually changed from a multiplied cycle of a last multiplied pulse generated based on the previous detection signal to a multiplied cycle of a last multiplied pulse to be generated this time, and that a sum of multiplied cycles of multiplied pulses to be generated is consistent with the estimated cycle.

Further another aspect of the present invention may provide an image forming apparatus. The image forming apparatus may include a recording head, a recording controller, a carriage, a carriage mover, and one of the aforementioned multiplied pulse generation devices.

The recording head forms an image onto a recording medium by ejecting ink. The recording controller controls ejection timing of ink from the recording head. The carriage mounts the recording head as the driven object thereon. The carriage mover reciprocates the carriage in a main scanning direction which is an image forming direction. The recording controller uses the multiplied pulse generated by the multiplied pulse generation unit as the ejection timing during a move of the carriage by the carriage mover.

Further another aspect of the present invention may provide an image reading apparatus. The image reading apparatus may include an image reader, a reading controller, an image reader mover, and one of the aforementioned multiplied pulse generation devices.

The image reader read an image formed on a document. The reading controller controls reading timing of the image by the image reader. The image reader mover moves the image reader in a main scanning direction which is an image reading direction. The reading controller uses the multiplied pulse generated by the multiplied pulse generation unit as the reading timing during a move of the image reader by the image reader mover.

BRIEF DESCRIPTION OF THE DRAWINGS

The invention will now be described below, by way of example, with reference to the accompanying drawings, in which:

FIG. 17 is an explanatory diagram showing a conventional multiplied pulse generation method.

DETAILED DESCRIPTION OF THE PREFERRED EMBODIMENT

First Embodiment (1) Overall Structure of Multi Function Apparatus

Figure 1:
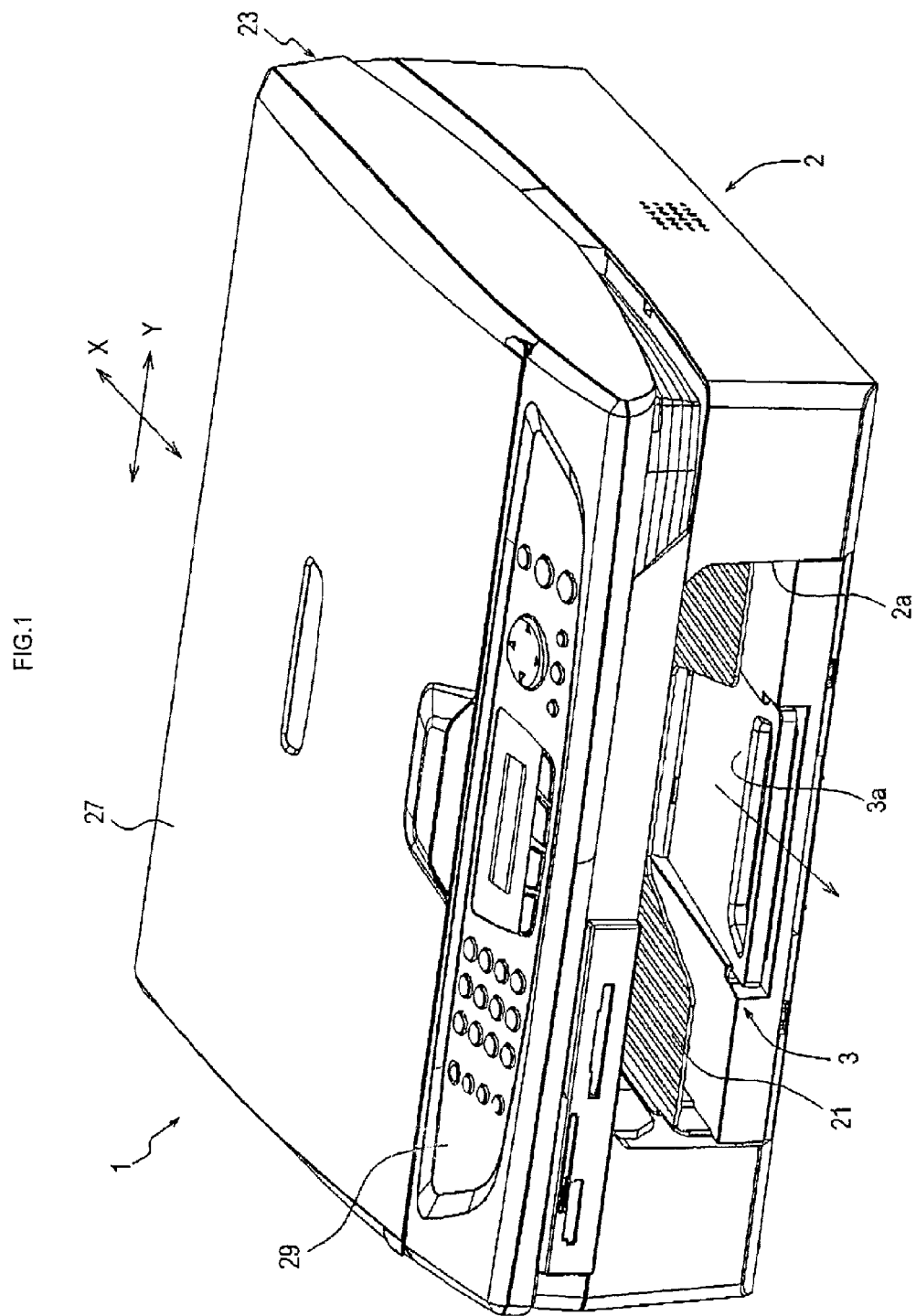
FIG. 1 is a perspective view of a multi function apparatus according to embodiments.
Figure 2:
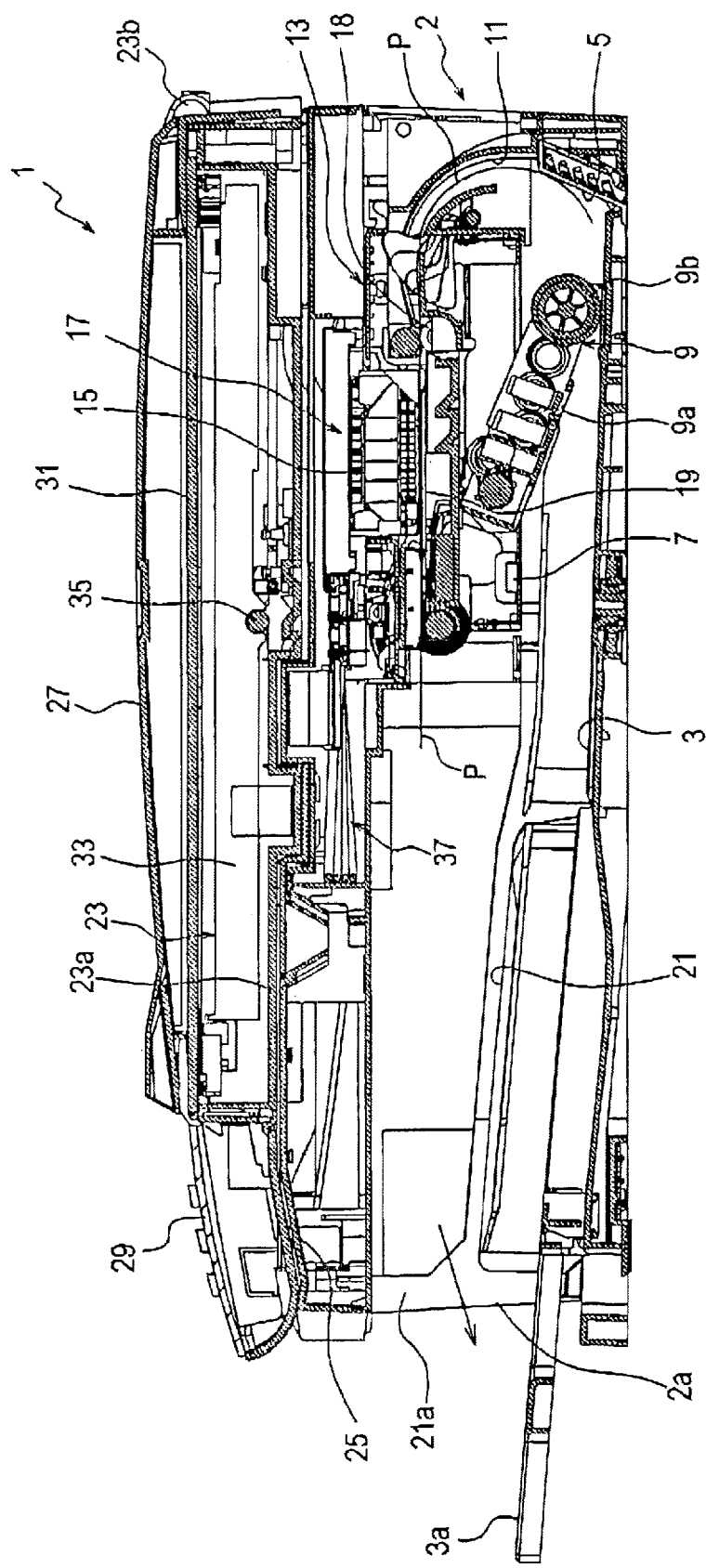
FIG. 2 is a cross sectional side view of the multi function apparatus according to the embodiments.

FIG. 1 is a perspective view of a multi function apparatus (MFD: Multi Function Device) 1 according to the present embodiments. FIG. 2 is a cross sectional side view of the multi function apparatus 1.

Referring to FIGS. 1 and 2, the multi function apparatus 1 of the present embodiment is provided with a printer function, a copying function, a scanner function and a facsimile function. The multi function apparatus 1 is provided with a paper cassette 3 at the bottom of a housing 2 made of synthetic resin. The paper cassette 3 can be inserted through an opening 2a formed at the front of the housing 2.

The paper cassette 3 is designed to store a plurality of paper P which are cut into A4 size or legal size, for example. Narrow sides of each paper P are arranged to be parallel to a main-scanning direction (i.e., Y-axis direction) orthogonal to a paper conveying direction (i.e., sub-scanning direction or X-axis direction).

At the front end of the paper cassette 3, a supplemental supporting member 3a is movably attached in the X-axis direction to support the back end of the long paper P such as a legal-sized paper. At the back of the paper cassette 3, a bank 5 for paper separation is arranged. In the multi function apparatus 1, a feeder arm 9a composing a feeder 9 is turnably attached to the bottom plate of a box-like main frame 7 made of metal, so as to swing up and down on its anchor end. The paper P stacked (accumulated) in the paper cassette 3 are separated and conveyed sheet by sheet by a feeder roller 9b provided at a lower end of the feeder arm 9a and the bank 5. Each separated paper P is conveyed to an image forming portion 13 provided above (at a higher position of) the paper cassette 3 via a U-turn path 11 which composes a U-shaped conveyor path.

The image forming portion 13 includes a carriage 17. An ink-jet recording head 15 is mounted on the carriage 17. The carriage 17 can reciprocate in a main scanning direction. The carriage 17 is controlled by a later explained CPU 51 to move the recording head 15 in the main scanning direction. The recording head 15 ejects ink at the time of scanning to form an image on the paper P located therebelow. At this point, the paper P is supported from downward by a platen 19 which composes the conveyor path. That is, the recording head 15 is located immediately above the platen 19. Image forming onto the paper P by the recording head 15 is performed on the platen 19.

Paper conveyance at image forming operation is achieved as the paper P is sequentially fed in a sub-scanning direction (paper conveying direction) by a predetermined amount by a conveyor roller 18. Particularly, when the reciprocatable recording head 15 performs recording for one path in the main scanning direction, the paper P is fed in the sub-scanning direction by a predetermined amount and stopped for recording for the next path. Recording in the main scanning direction for the path is performed by the recording head 15. When recording is ended, the paper P is again fed in the sub-scanning direction by a predetermined amount and stopped for recording for the next path. Recording in the main scanning direction for the path is performed by the recording head 15. That is, paper feeding by the predetermined amount by the conveyor roller 18 in the sub-scanning direction is sequentially repeated until completion of recording onto the paper P.

Figure 4:
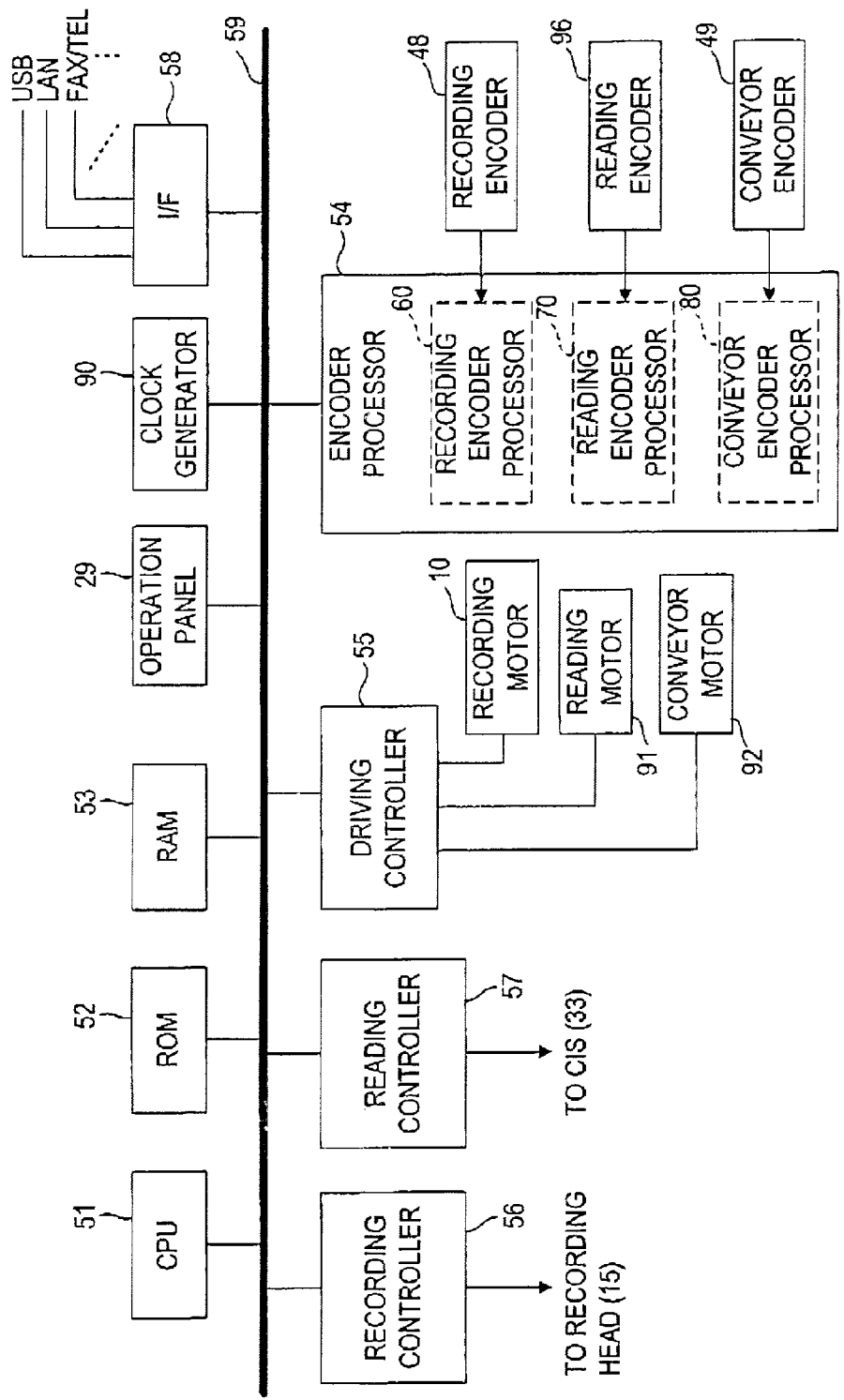
FIG. 4 is a block diagram schematically showing an electric structure of the multi function apparatus according to the embodiments.

The conveyor roller 18 is driven by a conveyor motor 92 (not shown in FIGS. 1 and 2; see FIG. 4). The conveyor roller 18 is provided with a conveyor encoder (optical rotary encoder) 49 (not shown in FIGS. 1 and 2; see FIG. 4) that outputs a pulse signal every time the conveyor roller 18 is rotated by a predetermined amount. The drive of the conveyor roller 18 is controlled based on the pulse signal from the conveyor encoder 49.

A paper discharge portion 21 discharges the paper P having an image formed thereon by the image forming portion 13. The paper discharge portion 21 is provided above the paper cassette 3. A paper discharge opening 21a which communicates with the paper discharge portion 21 opens together with the opening 2a at the front of the housing 2.

An image reading apparatus 23 for use in reading a document is provided above the housing 2. The image reading apparatus 23 is arranged such that a bottom wall 23a thereof is placed onto an upper cover body 25 without leaving any substantial space therebetween. The image reading apparatus 23 is designed to be opened and closed with respect to one end of the housing 2 via a not shown pivot shank. Also, a back end of a cover body 27 which covers the upper surface of the image reading apparatus 23 is turnably attached so as to swing up and down with respect to a back end of the image reading apparatus 23 about a pivot shaft 23b.

An operation panel 29 including various operation buttons and a liquid crystal display is provided at the front of the image reading apparatus 23. A glass plate 31 is provided on top of the image reading apparatus 23. When the cover body 27 is opened upward, a document can be set on the glass plate 31. An image scanner (CIS: Contact Image Sensor) 33 for document reading is provided under the glass plate 31. The CIS 33 can reciprocate along a guide shaft 35 which extends in the sub-scanning direction (Y-axis direction).

The CIS 33 is driven (reciprocates) by a reading motor 91 (not shown in FIGS. 1 and 2; see FIG. 4). The CIS 33 reads a document while being driven to a direction (hereinafter, referred to as "reading forward direction") to scan the document from a predetermined document setting reference position by the reading motor 91. After reading, the CIS 33 is driven to the reverse direction (hereinafter, referred to as "reading backward direction") by the reading motor 91 to return to the original document setting reference position. The CIS 33 is provided with a reading encoder (optical linear encoder) 96 (not shown in FIGS. 1 and 2; see FIG. 4) that outputs a pulse signal every time the CIS 33 moves a predetermined amount. Drive of the CIS 33 is controlled based on the pulse signal from the reading encoder 96.

A not shown ink storage which opens upward is provided at the front part of the housing 2 covered by the image reading apparatus 23. Four ink cartridges are provided in the ink storage, which respectively store four colors (black, cyan, magenta and yellow) of ink for full color recording. The respective ink cartridges can be attached and detached from above. In the multi function apparatus 1 of the present embodiment, ink stored in the respective ink cartridges is supplied to the recording head 15 via a plurality of ink supply tubes 37 which connect the respective ink cartridges with the recording head 15.

(2) Structure of Image Forming Portion

Figure 3:
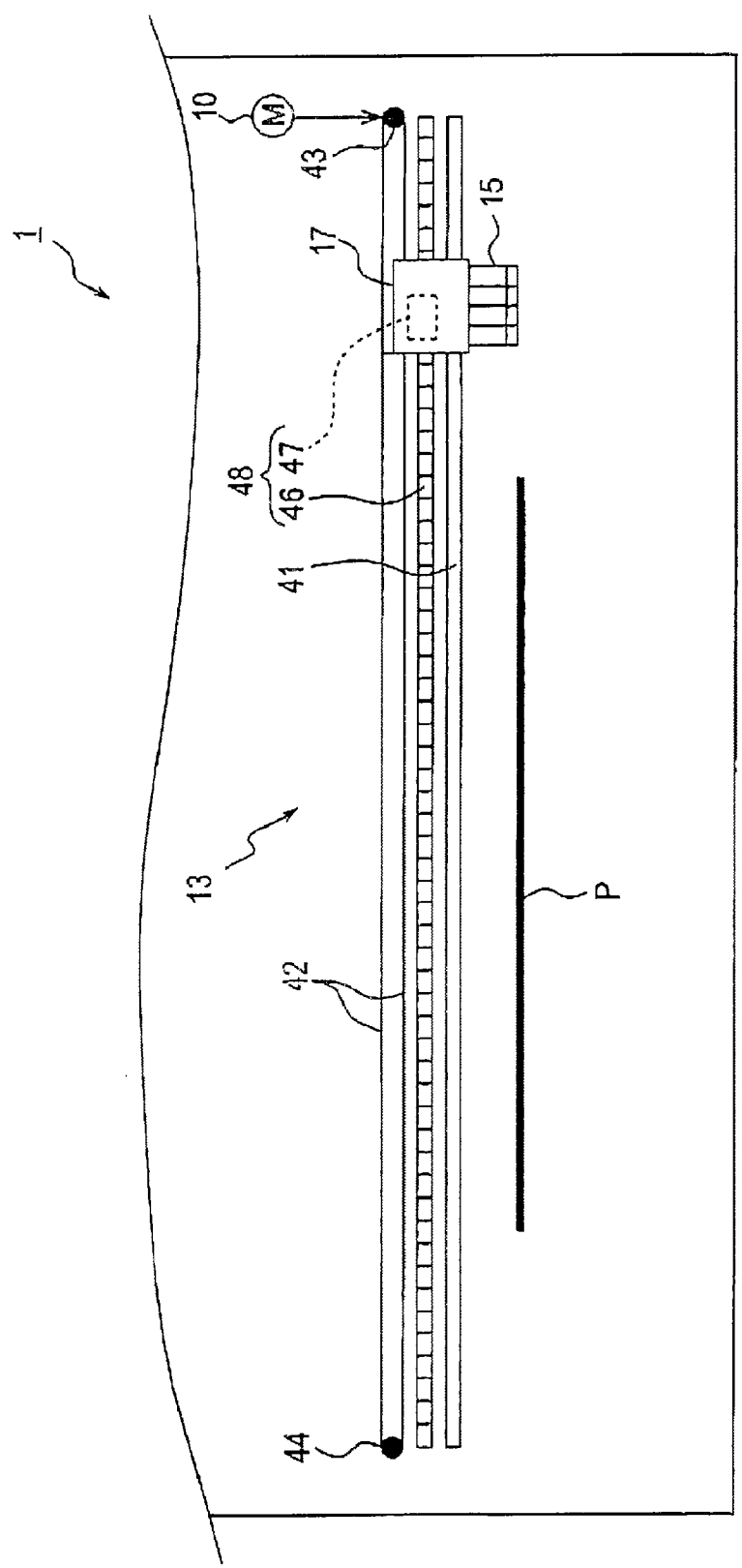
FIG. 3 is a view showing a schematic structure of an image forming unit provided in the multi function apparatus according to the embodiments.

Now, the structure of the image forming portion 13 provided in the multi function apparatus 1 will be explained more particularly. FIG. 3 is a schematic view showing the structure of the image forming portion 13 of the multi function apparatus 1. The image forming portion 13 shown in FIG. 3 is a diagrammatic representation of the image forming portion 13 in the multi function apparatus 1 of FIGS. 1 and 2 from the viewpoint of carriage 17 drive. Thus, the components identical to those of FIGS. 1 and 2 are given the same reference numbers.

As seen from FIG. 3, in the image forming portion 13 of the multi function apparatus 1, a guide bar 41 is disposed in a width direction of the paper P conveyed by the conveyor roller 18. The carriage 17 mounting the recording head 15 thereon is pierced through by the guide bar 41.

The carriage 17 is connected to an endless belt 42 provided along the guide bar 41. The endless belt 42 is held between a driving pulley 43 of a recording motor 10 provided on one end of the guide bar 41 and a driven pulley 44 provided on the other end of the guide bar 41. That is, the carriage 17 is designed to reciprocate in the width direction of the paper P along the guide bar 41 by a driving force of the recording motor 10. The driving force of the driving motor 10 is transmitted via the endless belt 42.

In the vicinity of the guide bar 41, a linear scale 46 is disposed along the guide bar 41 (i.e., along the moving path of the carriage 17). Slits having a certain interval therebetween are formed on the linear scale 46. A detection unit 47 is provided to face the linear scale 46 with respect to the carriage 17. The detection unit 47 includes not shown light emitting element and light receiving element. The linear scale 46 is located between the light emitting element and the light receiving element. The detection unit 47 and the linear scale 46 together constitute a recording encoder 48 (optical linear encoder). The recording encoder 48 detects travel distance of the carriage 17.

The detection unit 47 outputs two types of pulse signal, phase-A signal and phase-B signal. The phase of phase A signal and the phase of phase-B signal is shifted by a predetermined cycle (¼ cycles, in the present embodiment). When the carriage 17 is moved in a left direction in FIG. 3 (from the side of the driving pulley 43 toward the driven pulley 44; hereinafter, referred to as "recording forward direction"), the phase of phase-A signal is advanced ahead of the phase of phase-B signal by the predetermined cycle. When the carriage 17 is moved from the side of the driven pulley 44 to the driving pulley 43 (hereinafter, referred to as "recording backward direction"), the phase of phase-A signal is delayed from the phase of phase-B signal by the predetermined cycle. The reading encoder 96 provided in the CIS 33 basically has the same structure as the recording encoder 48, and thus functions in the same manner as the recording encoder 48.

(3) Electric Structure of Multi Function Apparatus

Now, the electric structure of the multi function apparatus 1 is explained by way of FIG. 4. The multi function apparatus 1 of the present embodiment includes a CPU 51, a ROM 52, a RAM 53, an encoder processor 54, a drive controller 55, a recording controller 56, a reading controller 57 and a clock generator 90. These components are connected to each other via a bus 59. The CPU 51 is responsible for various controls of the overall apparatus. The ROM 52 stores programs and data for various control processes executed by the CPU 51. The RAM 53 temporarily stores various data when the CPU 51 performs calculation. The encoder processor 54 performs various processes based on signal (pulse signal) from the aforementioned various encoders 48, 49 and 96. The drive controller 55 controls drive of the various motors 10, 91 and 92. The recording controller 56 controls image forming (ink ejection) by the recording head 15. The reading controller 57 controls image reading by the CIS 33. The clock generator 90 generates clock signal having a sufficiently shorter cycle than pulse signal from the various encoders 48, 49 and 96 and supplies the clock signal to each portion of the multi function apparatus 1. Other than the above components, the aforementioned operation panel 29 and an external interface (I/F) 58 are also connected to the bus 59. The external interface 58 includes various interfaces such as USB, LAN, FAX and TEL (voice call). The multi function apparatus 1 can be connected to external apparatus provided with the various interfaces via the external interface 58.

As noted above, the recording encoder 48 outputs two types of pulse signal (phase-A signal and phase-B signal) as the carriage 17 is moved. Each pulse signal is supplied to the recording encoder processor 60 in the encoder processor 54. The reading encoder 96 also outputs the two types of pulse signal (phase-A signal and phase-B signal) as the CIS 33 is moved. Each pulse signal is supplied to the reading encoder processor 70 in the encoder processor 54.

Figure 5:
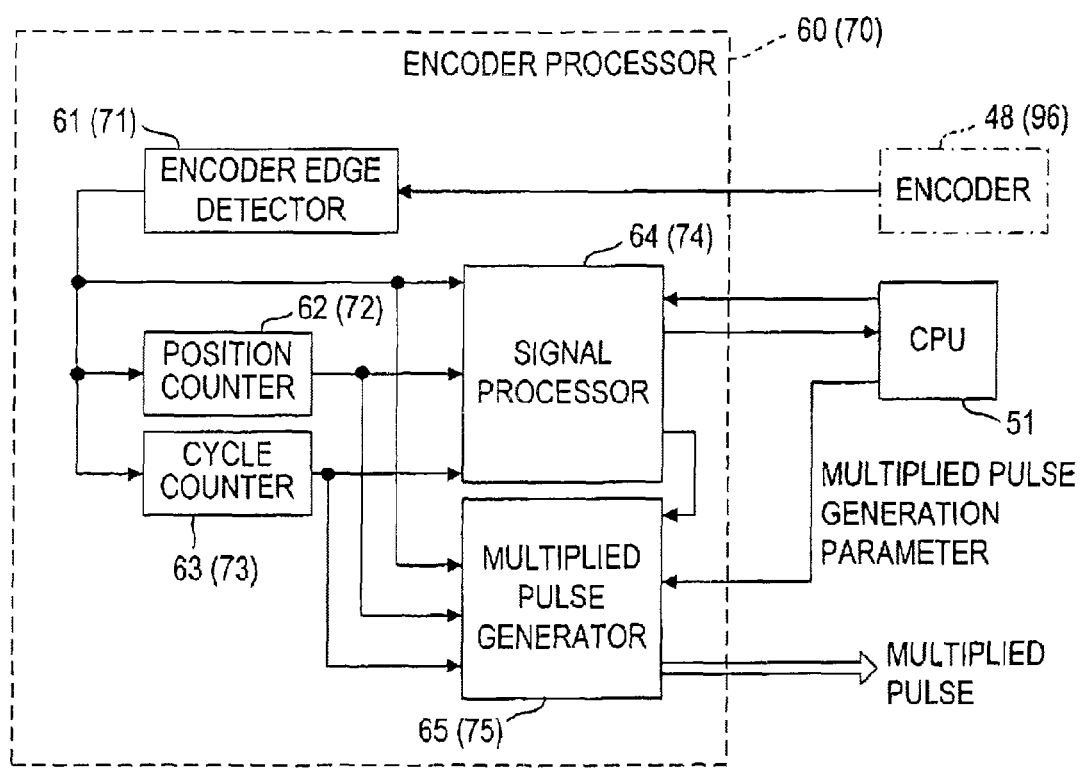
FIG. 5 is a block diagram schematically showing a recording encoder processor and a reading encoder processor.

FIG. 5 shows a schematic diagram of the recording encoder processor 60. An encoder edge detector 61 in the recording encoder processor 60 takes in each pulse signal from the recording encoder 48 to detect a leading edge of the phase-A signal and the rotation direction of the recording motor 10. Detection of the leading edge of the phase-A signal is outputted as an edge detection signal.

Figure 10:
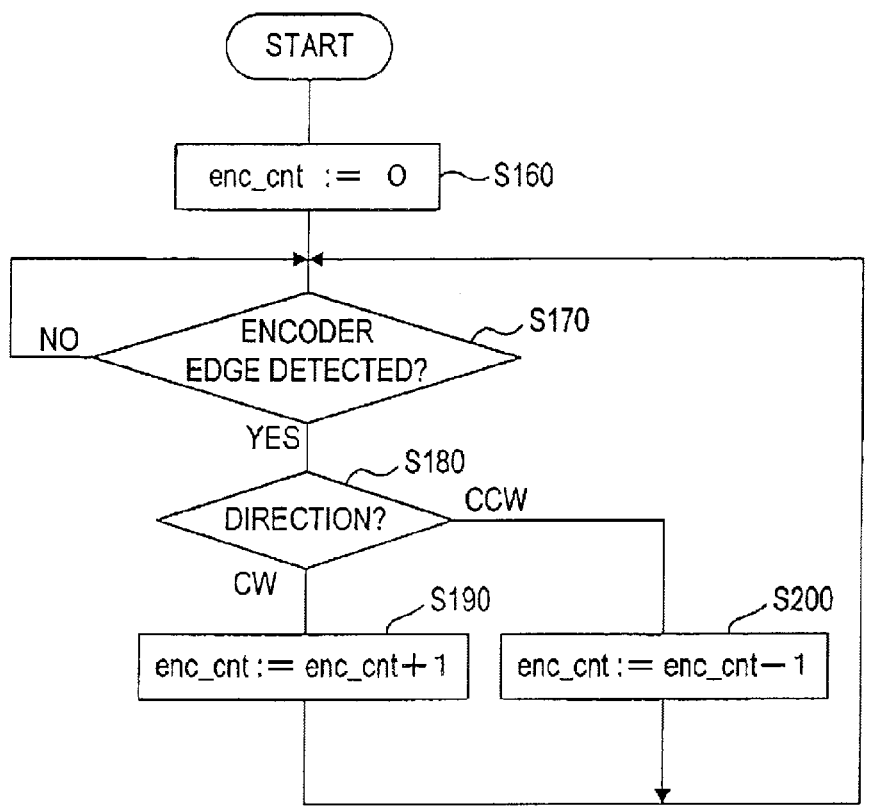
FIG. 10 is a flowchart showing an edge number count process.

The position counter 62 counts up or down an edge count value (enc_cnt) by the edge detection signal depending on the rotation direction of the recording motor 10 detected by the encoder edge detector 61 (see FIG. 10). The edge count value (enc_cnt) is outputted to a signal processor 64 and a multiplied pulse generator 65.

A cycle counter 63 is initialized every time an edge detection signal is supplied from the encoder edge detector 61. The cycle counter 63 counts the clock signal from the clock generator 90 to measure elapsed time after supply of the edge detection signal (see FIG. 11). The counted value as an edge cycle count value (enc_cyc) is outputted to the signal processor 64 and the multiplied pulse generator 65.

The multiplied pulse generator 65 generates and outputs a multiplied pulse obtained by multiplying the edge detection signal by a predetermined multiplication factor R (R-times multiplication), per leading edge of the phase-A signal in the recording encoder 48, that is, every time an edge detection signal is supplied from the encoder edge detector 61. To be exact, the multiplied pulse generator 65 does not multiply the actual frequency of the edge detection signal but generates and outputs a multiplied pulse in a simulated manner by a later-explained process.

The multiplied pulse generator 65 obtains a time interval (actual cycle) from input of the previous edge detection signal until input of the present edge detection signal based on the edge cycle count value (enc_cyc) from the cycle counter 63 per each input of edge detection signal. The actual cycle retains values for the past m cycles. The multiplied pulse generator 65 estimates a time interval until input of the next edge detection signal based on the past m actual cycles including the actual cycle obtained this time per each input of edge detection signal.

When an estimated value (estimation cycle Te) is obtained, the multiplied pulse generator 65 calculates the multiplied cycle of the multiplied pulse to be generated by a predetermined equation (equation (1) later described), based on the obtained estimation cycle Te and a multiplied cycle $t_{pR}$ of the last multiplied pulse in the last encoder period (i.e., the last $(R^{th})$ multiplied pulse among the multiplied pulses generated upon input of the previous edge detection signal). The multiplied cycle here indicates a time interval between sequentially outputted multiplied pulses. The multiplied cycle for the $r^{th}$ multiplied pulse means a time interval between the $(r-1)^{th}$ multiplied pulse and the $r^{th}$ multiplied pulse. However, the multiplied cycle of a firstly generated and outputted multiplied pulse is indicated by a time interval from input of an edge detection signal until output of the first multiplied pulse.

The multiplied pulse generator 65, after calculation of the multiplied cycle, generates (outputs) the multiplied pulse when time corresponding to the calculated multiplied cycle has elapsed. The multiplied pulse generator 65 subsequently calculates the multiplied cycle of the multiplied pulse to be outputted next and outputs the multiplied pulse again after time corresponding to the obtained multiplied cycle has elapsed. Such process is repeated until completion of output of all the R multiplied pulses.

The signal processor 64 processes various signals, such as the edge detection signal, the edge count value (enc_cnt) and the edge cycle count value (enc_cyc), to be outputted to the CPU 51 as required. The signal processor 64 also processes various signals (instructions) supplied from the CPU 51 to be outputted to each portion of the recording encoder processor 60.

An example of the signal to be supplied from the CPU 51 to the signal processor 64 is a signal that indicates whether or not to generate a multiplied pulse by the multiplied pulse generator 65. In the multi function apparatus 1 of the present embodiment, generation of a multiplied pulse is not required at all times. There are cases in which a multiplied pulse is required (e.g., at the time of image forming or image reading) or not required. Accordingly, the CPU 51 provides instructions on whether or not to generate a multiplied pulse to the multiplied pulse generator 65 via the signal processor 64. Also, various parameters necessary to generate a multiplied pulse are set in the multiplied pulse generator 65 by the CPU 51.

The multiplied pulse outputted from the multiplied pulse generator 65 is supplied to a recording controller 56. In the recording controller 56, the supplied multiplied pulse is used as operation timing (ink ejection timing) of the recording head 15 to control operation of the recording head 15.

The structure of the recording encoder processor 60 has been explained above. The structure of the reading encoder processor 70 is basically the same as the above recording encoder processor 60 and can be represented in the same block diagram as in FIG. 5. That is, FIG. 5 shows the both structures of the recording encoder processor 60 and the reading encoder processor 70. Accordingly in FIG. 5, the reference numbers relating to the reading encoder processor 70 are shown in brackets next to the reference number relating to the recording encoder processor 60. Consequently, detailed explanation on the reading encoder processor 70 is omitted.

The multiplied pulse outputted from the multiplied pulse generator 75 in the reading encoder processor 70 is supplied to a reading controller 57. In the reading controller 57, the supplied multiplied pulse is used as operation timing (image reading timing) of the CIS 33 to control image reading operation.

Figure 13:
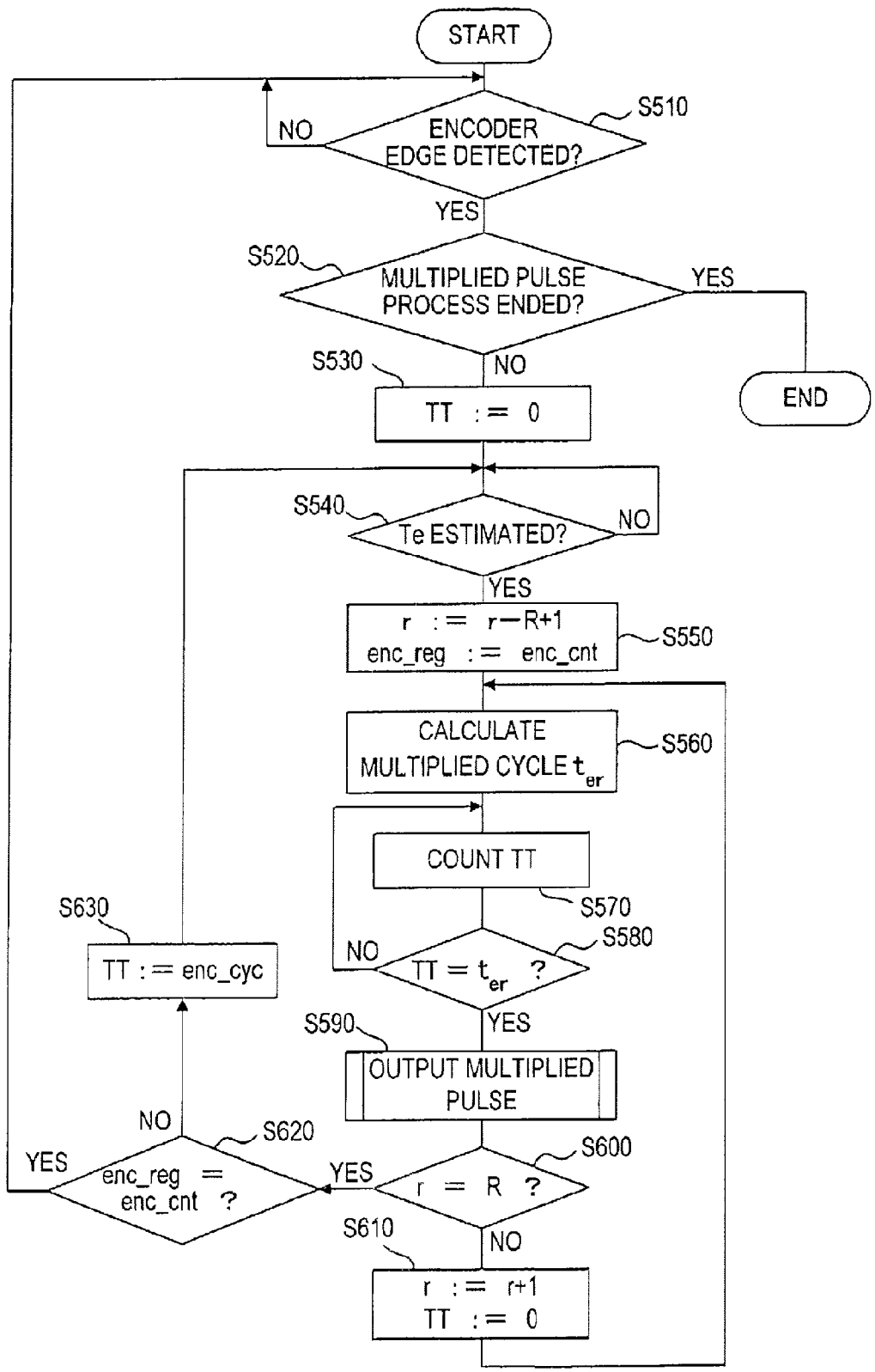
FIG. 13 is a flowchart showing a multiplied pulse generation process executed by a multiplied pulse generator in the recording encoder processor.

In comparison between the respective encoder processors 60 and 70, the multiplied pulse generation process in the multiplied pulse generator 75 of the reading encoder processor 70 (see FIG. 14) is partly different from the multiplied pulse generation process in the multiplied pulse generator 65 of the recording encoder processor 60 (see FIG. 13). The details will be explained later.

Returning to FIG. 4, the conveyor encoder 49 is provided in the conveyor roller 18 (see FIG. 2), as noted above. The output signal from the conveyor encoder 49 is supplied to a conveyor encoder processor 80 in the encoder processor 64. The conveyor encoder processor 80 detects and counts the pulse signal from the conveyor encoder 49 to detect the amount of rotation of the conveyor motor 92 and the conveyor roller 18 as well as the travel distance (conveying distance) of the paper P conveyed by the conveyor roller 18. The driving controller 65 controls drive of the conveyor motor 92 (and drive of the conveyor roller 18) based on the result of detection of the conveyor encoder processor 80.

Various signals (signals indicating travel direction and travel distance) from the aforementioned recording encoder processor 60 and various signals (signals indicating travel direction and travel distance) from the reading encoder processor 70 are inputted to the driving controller 55. The recording motor 10 and the reading motor 91 are controlled based on these various signals. All of the recording motor 10, the reading motor 91, and the conveyor motor 92 are DC motors, for example.

(4) Generation Method of Multiplied Pulse

Now, explanation will be given on how the multiplied pulse is generated in the recording encoder processor 60 and the reading encoder processor 70. In the present embodiment, the basic method on how to generate the multiplied pulse is the same in both the recording encoder processor 60 and the reading encoder processor 70. Accordingly, in below explanation, the process performed in the recording encoder processor 60 will be described. At the same time, the reference numbers of components corresponding to those in the reading encoder processor 70 are added in brackets to the reference numbers of respective components of the recording encoder processor 60. Unless otherwise noted, the process is performed in the same manner in the reading encoder processor 70 as well.

In the present embodiment, every time the edge detection signal is outputted from the encoder edge detector 61 (71), the multiplied pulse obtained by multiplying the detection signal by the multiplication factor R is generated as noted above. However, multiplied pulses having constant multiplied cycles are not generated as before. Instead, multiplied pulses are generated which have multiplied cycles that are linearly (gradually) changed from the last multiplied pulse (that is, the last ($R^{th}$) multiplied pulse among the multiplied pulses generated when an edge detection signal was outputted last time) to the last ($R^{th}$) multiplied pulse among the multiplied pulses to be generated this time. Also, a sum of each multiplied cycle of the multiplied pulses to be generated is consistent with the estimated cycle Te.

That is, the multiplied cycle of each multiplied pulse is calculated such that the multiplied cycle is monotonically increased, monotonically decreased, or constant from the last multiplied pulse (having the multiplied cycle $t_{pR}$) generated last time to the last ($R^{th}$) multiplied pulse to be generated this time. Multiplied pulses are sequentially outputted according to the calculated multiplied cycle.

The multiplied cycle $t_{er}$ of the $r^{th}$ ($1 \leq r \leq R$) multiplied pulse among the R multiplied pulses to be generated is particularly obtained by equation (1) below. Te indicates the estimated cycle and R indicates the multiplication factor.

$$t_{cr} = \frac{2r}{R(R+1)} \cdot T_c + \frac{R-2r+1}{R+1} \cdot t_{pR}, \quad 1 \leq r \leq R \tag{1}$$

where r indicates the output order of the multiplied pulse from an encoder edge.

Figure 6:
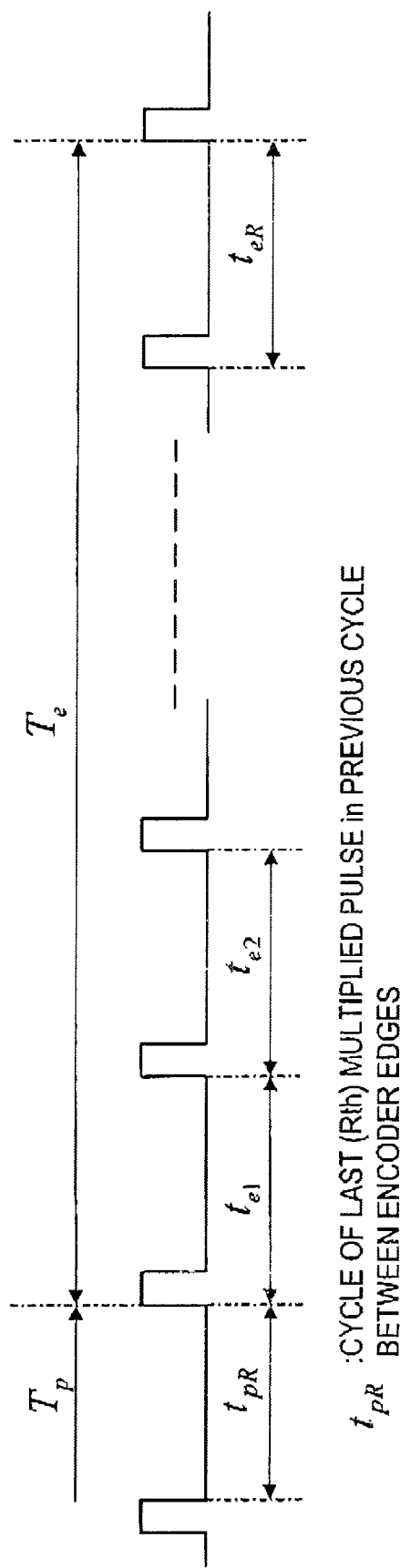
FIG. 6 is an explanatory diagram showing a relationship between each multiplied pulse and an estimated cycle according to a first embodiment.

Calculation process of equation (1) will be explained. In the present embodiment, as shown in FIG. 6, when an edge detection signal is outputted, a time interval until output of the next edge detection signal is estimated using a prepared estimate equation (equation (9)) based on the past m actual cycles including the actual cycle Tp in the last encoder period. Each multiplied cycle $t_{e1}, t_{e2}, \ldots, t_{eR}$ of the R multiplied pulses to be generated is calculated based on the estimated estimation cycle Te and the multiplied cycle $t_{pR}$ of the last multiplied pulse (the last multiplied pulse in the last encoder period).

Linear change in multiplied cycles of the multiplied pulses to be generated means that the multiplied cycles from the multiplied cycle $t_{e1}$ of the first multiplied pulse to the multiplied cycle $t_{eR}$ of the last multiplied pulse have an equal difference (arithmetic progression). The sum of the multiplied cycles corresponds to the estimation cycle Te. Thus, applying an equation of sum of arithmetic progression, equation (2) can be obtained.

$$\begin{aligned} T_c &= t_{c1} + t_{c2} + \cdots + t_{cR} \\ &= t_{c1} + (t_{c1} + a) + \cdots + (t_{c1} + (R-1) \cdot a) \\ &= R \cdot t_{c1} + \frac{R(R-1)}{2} \cdot a \end{aligned} \quad (2)$$

where a is a tolerance of the multiplied cycle of the multiplied pulse to be generated.

Also, if an average $\bar{t}$ of the multiplied cycle of each generated multiplied pulse is calculated by equation (3), the multiplied cycle $t_{pR}$ of the last multiplied pulse generated last time can be expressed as equation (4). Thereby, the tolerance a is defined by equation (5).

$$\bar{t} = T_c / R \quad (3)$$

$$t_{pR} = \bar{t} - a \cdot \frac{R+1}{2} \quad (4)$$

$$a = \frac{2}{R+1}(\bar{t} - t_{pR}) \quad (5)$$

The multiplied cycle $t_{er}$ of the $r^{th}$ multiplied pulse to be generated is defined by equation (6) from a known relational expression of arithmetic progression.

$$t_{er} = t_{e1} + (r-1) \cdot a \quad (6)$$

In view of equations (2), (5) and (6), the multiplied cycle $t_{er}$ is expressed by equation (7) (=equation (1)).

$$\begin{aligned} t_{cr} &= \bar{t} - \frac{R-1}{R+1} \cdot (\bar{t} - t_{pR}) + (r-1) \cdot \frac{2}{R+1} \cdot (\bar{t} - t_{pR}) \\ &= \left(1 - \frac{R-1}{R+1} + \frac{2(r-1)}{R+1}\right) \cdot \bar{t} + \left(\frac{R-1}{R+1} + \frac{2(r-1)}{R+1}\right) \cdot t_{pR} \\ &= \frac{2r}{R+1} \cdot \bar{t} + \frac{R-2r+1}{R+1} \cdot t_{pR} \\ &= \frac{2r}{R(R+1)} \cdot T_c + \frac{R-2r+1}{R+1} \cdot t_{pR} \end{aligned} \quad (7)$$

In this manner, equation (1) is obtained for calculation of the multiplied cycle $t_{er}$ of the multiplied pulse. Aside from this, the multiplied cycle $t_{er}$ can be obtained using only the characteristics of arithmetic progression.

That is, the multiplied cycle of each multiplied pulse to be generated is assumed as each term of arithmetic progression having the multiplied cycle $t_{pR}$ of the last multiplied pulse generated last time as the first term and the multiplied cycle $t_{eR}$ of the last multiplied pulse to be generated this time as the last term.

Particularly, since the multiplied cycle $t_{pR}$ of the last multiplied pulse generated last time is changed to the multiplied cycle $t_{eR}$ of the last multiplied pulse to be generated this time by the tolerance a, equation (8) below can be obtained.

$$a = t_{e1} - t_{pR} \quad (8)$$

Equation (1) can be obtained from equations (2) and (8).

Figure 7:
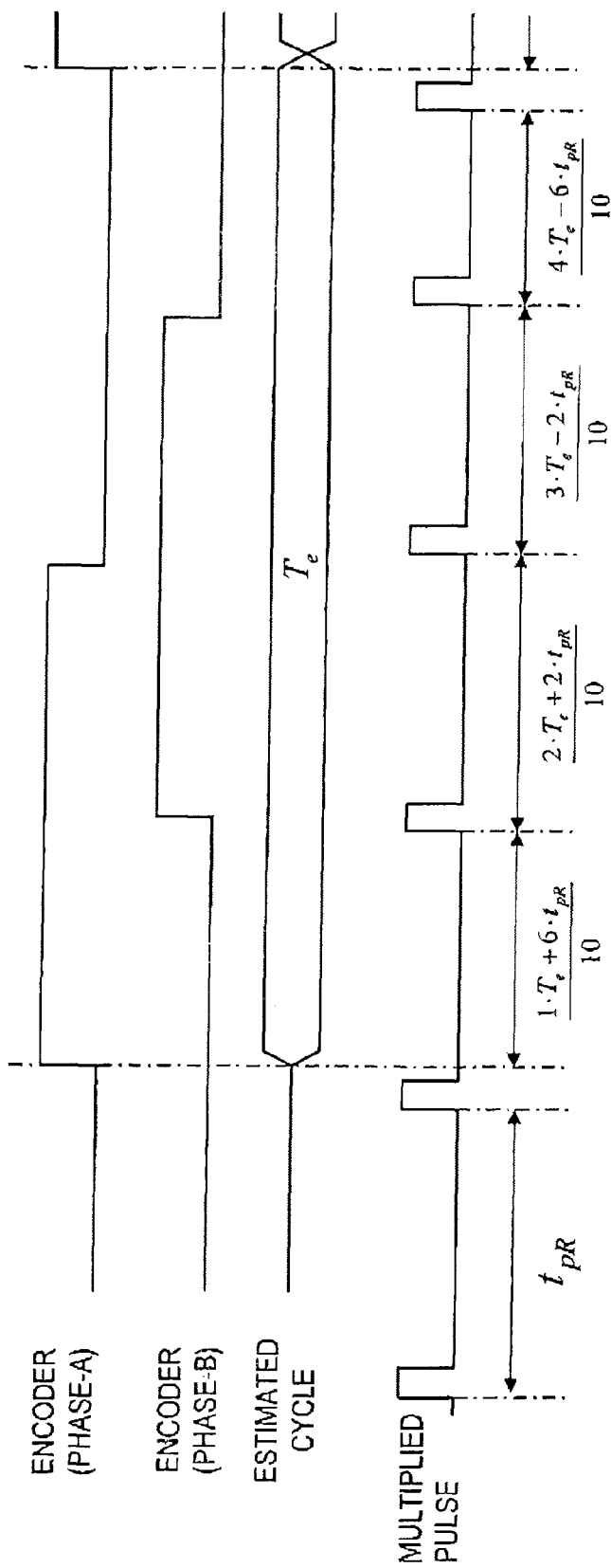
FIG. 7 is an explanatory diagram showing an actual example of the multiplied pulse according to the first embodiment (in the case of four-times multiplication)

FIG. 7 shows an actual example of the multiplied pulse obtained by equation (1) when the multiplication factor R is four (four-times multiplication). When the edge detection signal is outputted from the encoder edge detector 61 (71) at leading edge timing of the phase-A signal, the multiplied pulse generator 65 (75) calculates the estimated cycle Te. Then, the multiplied cycle is sequentially calculated by equation (1) to output a multiplied pulse. The multiplied cycles of the generated pulses are changed as shown in FIG. 7.

Figure 11:
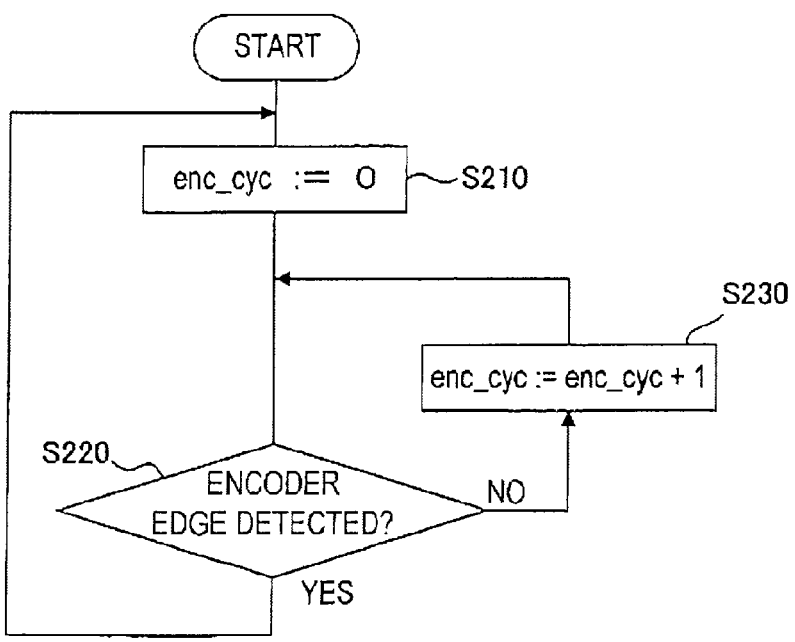
FIG. 11 is a flowchart showing an edge cycle count process.

Now, generation steps of the aforementioned multiplied pulse will be particularly explained by way of FIGS. 8 to 14. The multiplied pulse generator 65 (75) which executes steps of FIGS. 8 and 12, the multiplied pulse generator 65 which executes steps of FIG. 13, the multiplied pulse generator 75 which executes steps of FIG. 14, the position counter 62 (72) which executes steps of FIG. 10, and the cycle counter 63 (73) which executes steps of FIG. 11, are all designed as a so-called hardware circuit which performs various processes. However, each sequence of the various processes of the hardware circuits is replaced with a flowchart in the following description for the sake of easy understanding.

Figure 8:
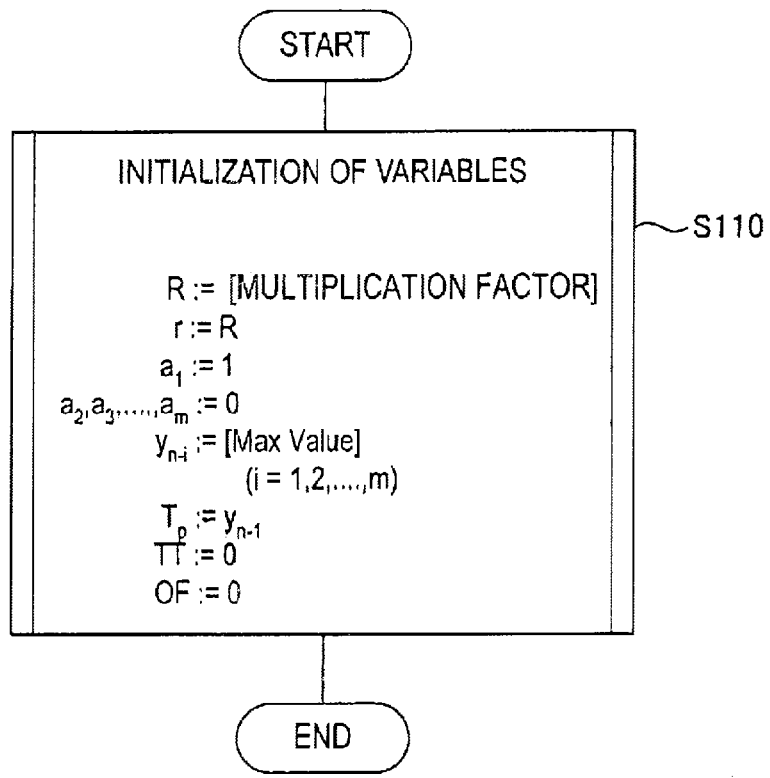
FIG. 8 is a flowchart showing a variable initialization process.

When the multi function apparatus 1 is powered on, a variable initialization process of FIG. 8 is performed in the multiplied pulse generator 65 (75). That is, after powered on, various variables (parameters) used for generating a multiplied pulse in the multiplied pulse generation unit 65 (75) are initialized in S110. Particular numeric values (variables) are supplied from the CPU 51 and set in various registers. In FIG. 8, "α:=β" indicates substitution of β to α.

In FIG. 8, m is the number of the past actual cycles for use in calculation of the estimated cycle Te, and $a_1, a_2, \ldots, a_m$ are coefficients for use in the estimate equation (equation (9)) which calculates the estimated cycle. At the initial stage, '1' is set to only $a_1$, and '0' is set to the other coefficients. Also, $y_{n-i}$ is a variable which retains in pieces of past data (actual cycle) for use in calculating the estimated cycle. Initially, a relatively large value (Max Value) which corresponds to a cycle at low velocity is set to $y_{n-i}$. The actual cycle Tp of the last encoder period is, of course, not measured at power-on. Thus, $y_{n-1}$ is set as the initial value. TT is a count value (multiple cycle count value) of a not shown multiplied cycle measurement counter that measures the cycle (multiplied cycle) of a multiplied pulse. OF is an overflag that is set when output timing of the last ($R^{th}$) multiplied pulse has passed the output timing of the next edge detection signal and later-explained predetermined conditions are satisfied. In the present embodiment, OF is set only to the multiplied pulse generator 75 of the reading encoder processor 70.

Here, equation (9) is used as an estimate equation that calculates the estimated cycle Te in the present embodiment.

$$\hat{y}_n = \sum_{i=1}^{m} a_i y_{n-i} \quad (9)$$

Figure 9:
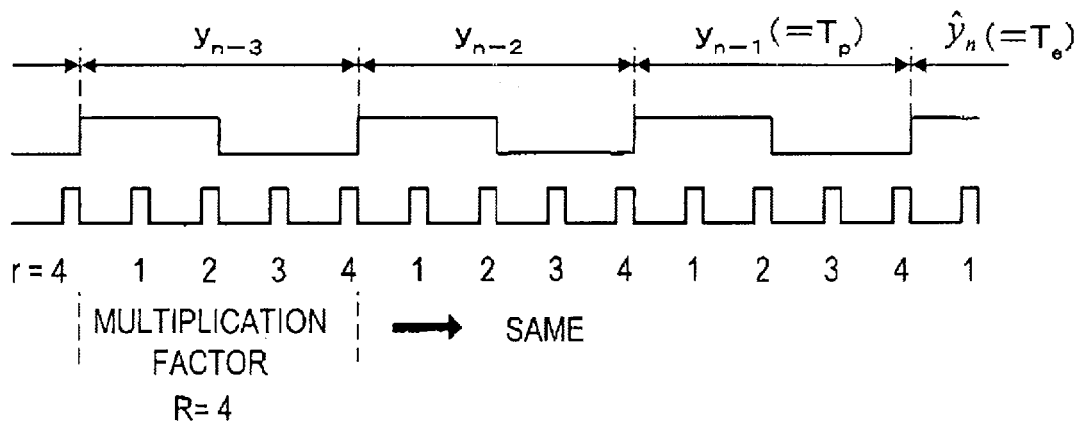
FIG. 9 is an explanatory diagram showing a relationship between a variable and time series signal.

FIG. 9 shows a relationship between each variable and a time-series signal when R=4. Here, when an edge detection signal is supplied to calculate $\hat{y}_n$, the last actual cycle is $y_{n-1}$ (=Tp), and the second to last actual cycle is $y_{n-2}$, and the third to last actual cycle is $y_{n-3}$.

Every time an edge detection signal is supplied, the multiplied pulse generator 65 (75) applies weight to each of the past m actual cycles ($y_{n-1}$ (=Tp), $y_{n-2}$, $y_{n-3}$, . . . , $y_{n-m}$) including the actual cycle of the last encoder period. The weighted cycles are summed up for cycle estimation. The cycle $\hat{y}_n$ obtained by equation (9) is set to an estimated cycle Te, as later explained.

Equations (10) to (12) show particular examples of the coefficient $a_i$ for use in equation (9). Equation (10) is an example of an estimate equation that estimates a cycle from the past two actual cycles. Equation (11) is an example of an estimate equation that estimates a cycle from the past three actual cycles. Equation (12) is an example of an estimate equation that estimates a cycle from the past four actual cycles.

$$\hat{y}_n = 2 \cdot y_{n-1} - y_{n-2} \quad (10)$$

$$\hat{y}_n = 3 \cdot y_{n-1} - 3 \cdot y_{n-2} + y_{n-3} \quad (11)$$

$$\hat{y}_n = 4 \cdot y_{n-1} - 6 \cdot y_{n-2} + 4 \cdot y_{n-3} - y_{n-4} \quad (12)$$

Now, an edge number count process carried out by the position counter 62 (72) will be explained by way of FIG. 10. In the edge number count process of FIG. 10, firstly, the edge count value (enc_cnt) is initialized (S160). Then, it is determined whether an encoder edge is detected, that is, an edge detection signal is outputted from the encoder edge detector 61 (71) (S170). The determination step of S170 is repeated until an edge detection signal is detected. When an edge detection signal is outputted (S170: YES), a moving direction of the carriage 17 (CIS 33) is determined (S180).

Particularly, in the recording encoder processor 60, it is determined whether the rotation direction of the recording motor 10 is CW (Clockwise; the carriage 17 is moved in recording forward direction, in the present embodiment) or CCW (Counterclockwise; the carriage 17 is moved in recording backward direction, in the present embodiment). In the reading encoder processor 70, it is determined whether the rotation direction of the reading motor 91 is CW (Clockwise; the CIS 33 is moved in reading forward direction, in the present embodiment) or COW (Counterclockwise; the CIS 33 is moved in reading backward direction, in the present embodiment).

In both cases of recording and reading, if the rotation direction is CW, the edge count value (enc_cnt) is incremented (Silo). If the rotation direction is CCW, the edge count value (enc_cnt) is decremented (S200).

Now, an edge cycle count process carried out by the cycle counter 63 (73) will be explained by way of FIG. 11. In the edge cycle count process of FIG. 11, firstly, the edge cycle count value (enc_cyc) is initialized (S210). Then, it is determined whether an encoder edge is detected, that is, an edge detection signal is outputted from the encoder edge detector 61 (71) (S220). The determination step of S220 is repeated and the edge cycle count value (enc_cyc) is sequentially incremented (S230) until an edge detection signal is detected. When an encoder edge is detected (S220: YES), the process returns to S210. That is, every time an encoder edge is detected, the time interval is measured from the detection until the next detection.

Figure 12:
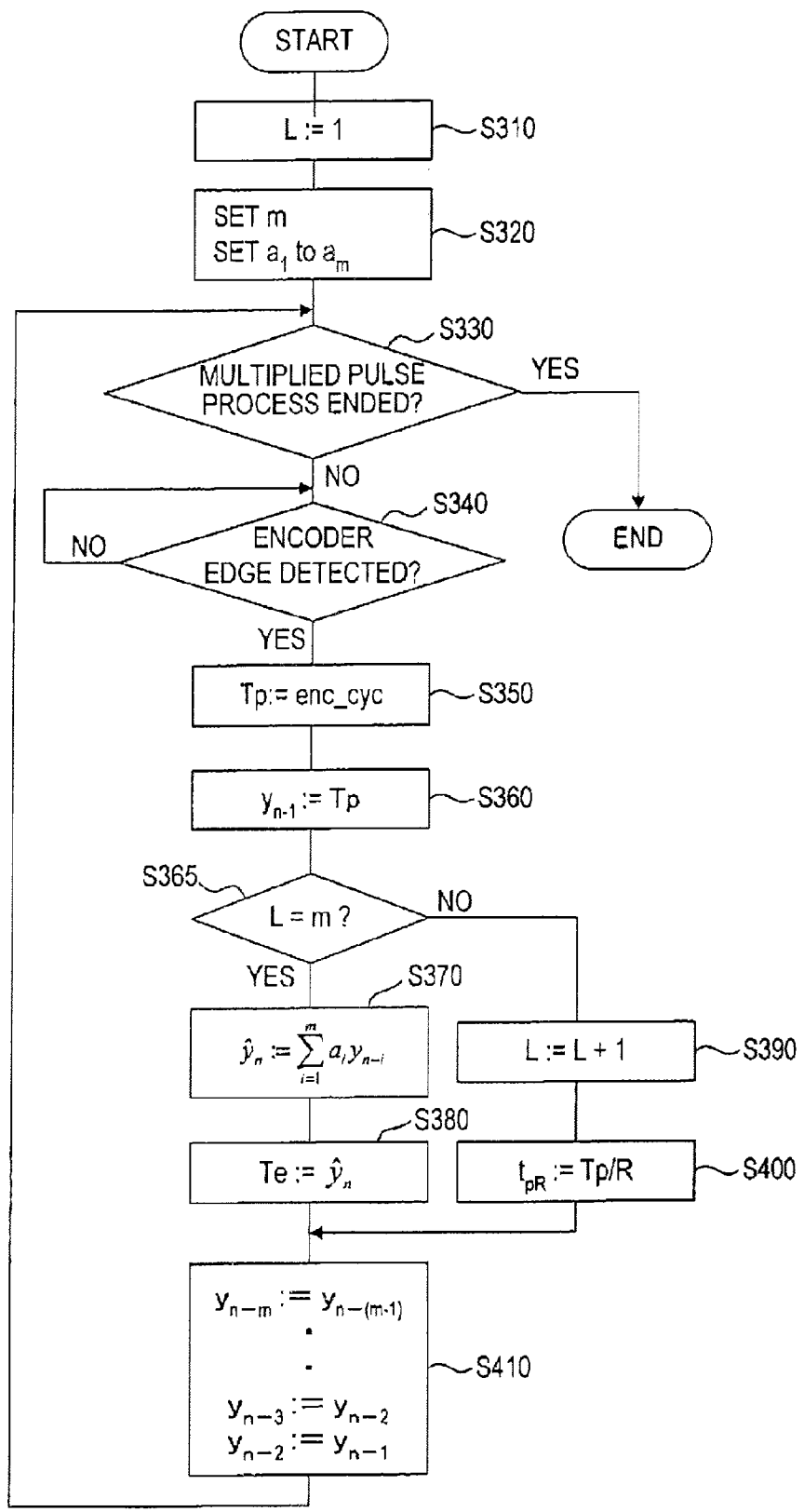
FIG. 12 is a flowchart showing a cycle estimation process.

Now, a cycle estimation process carried out by the multiplied pulse generator 65 (75) every time an edge detection signal is supplied will be explained by way of FIG. 12. In the cycle estimation process of FIG. 12, firstly, '1' is set to an estimate cancel counter L for canceling estimate calculation until m actual cycles necessary for estimation are obtained (S310). Subsequently, the number of actual cycles m necessary for estimation and the coefficient $a_i$ in equation (9) are set (S320). Both of these settings are based on setting parameters supplied from the CPU 51.

It is then determined whether the multiplied pulse process is ended, that is, whether instructions to execute multiplied pulse generation are received from the CPU 51 (S330). In this case, if generation of multiplied pulse is unnecessary and there is input of such instructions from the CPU 51 since, for example, the multi function apparatus 1 is in standby mode in which no recording or reading operation is performed (i.e., when the multiplied pulse process is ended) (S330: YES), the cycle estimate process is ended. However, if there are instructions to generate multiplied pulses (i.e., when the multiplied pulse process is to be started) (S330: NO), detection of an encoder edge is awaited (S340). If an encoder edge is detected by input of an edge detection signal (S340: YES), the edge cycle count value (enc_cyc) at the time (i.e., at the time when it has been positively determined in S220 (S220: YES) and at the time immediately before the step of S210 is carried out) is set to (substituted for) the actual cycle Tp (S350). The actual cycle Tp is set to $y_{n-1}$ (S360). That is, the actual cycle in the last encoder period is always set to Tp and $y_{n-1}$.

It is then determined whether the value in the estimate cancel counter L is equal to m, that is whether m actual cycles have been obtained (S365). If m actual cycles have not been obtained, estimate calculation is not performed and the estimate cancel counter L is incremented (S390). Furthermore, as the multiplied cycle $t_{pR}$ of the last multiplied pulse in the last encoder period, Tp/R is set which is the last actual cycle Tp averaged by the multiplication factor R (S400). That is, at the initial stage of encoder edge detection, in order to initialize $t_{pR}$ for use in later generation of a multiplied pulse, a value that equally distributes the last actual cycle in accordance with the multiplication factor is set as $t_{pR}$. Then, with respect to each actual cycle that has been measured and retained, the value retained in $y_{n-i}$ is shifted to $y_{n-(i+1)}$ (S410). That is, the last, the second to last, the third to last, . . . actual cycles are replaced to the second to last, the third to last, the fourth to last, . . . actual cycles for next encoder edge detection, respectively. Thereafter, the process returns to S330.

In this manner, the steps of S330 and onwards are repeated to increment L. When L=m (S365: YES), all the values necessary for estimation ($y_{n-1}$ to $y_{n-m}$) are gathered. Calculation for cycle estimation is performed using equation (9) (S370). The obtained cycle $\hat{y}_n$ is set to the estimated cycle Te (S380). The process moves to S410. Thereafter, per each encoder edge detection, the estimated cycle Te is updated.

Now, a multiplied pulse generation process executed by the multiplied pulse generator 65 of the recording encoder processor 60 will be explained by way of FIG. 13. In the multiplied pulse generation process of FIG. 13, firstly, it is determined whether or not an encoder edge is detected (S510). If an encoder edge is detected, it is determined whether the multiplied pulse process is ended (S520). The step of S520 is completely the same with the step of S330 in the cycle estimation process of FIG. 12.

When there is input of instructions to generate a multiplied pulse from the CPU 51 (S520: NO), 0 is set to the multiplied cycle count value TT of the multiplied cycle measurement counter. Under the condition that the estimated cycle Te is already calculated (S540: YES), r–R+1 is set to the output order r of the multiplied pulse to be generated, and the edge number count value (enc_cnt) at the time is set to a retained count value (enc_reg) of an edge number count value retaining register (not shown) (S550). Then, by equation (1) above, a multiplied cycle $t_{er}$ is calculated which is the cycle of the $r^{th}$ multiplied pulse (S560). After the multiplied cycle $t_{er}$ is obtained in this manner, the process may stand by until the time corresponding to $t_{er}$ elapses, and thereafter, the multiplied pulse may be outputted.

Accordingly, operation of the cycle measurement counter is started (S570). In the case of initial count operation after encoder edge detection, the elapsed time from the encoder edge detection is counted as the multiplied cycle count value TT. Counting is continued (S580: NO) until the multiplied cycle count value TT reaches the multiplied cycle $t_{er}$. When the multiplied cycle count value TT reaches the multiplied cycle $t_{er}$ (S580: YES), a multiplied pulse is outputted (S590).

It is then determined whether the output order r is equal to the multiplication factor R, that is, all the R multiplied pulses are outputted (S600). If not, the output order r is incremented and the multiplied cycle count value TT is reset to 0. The process returns to S560. Thereby, in S560, a time interval (multiplied cycle) between the $r^{th}$ multiplied pulse just outputted and the $(r+1)^{th}$ multiplied pulse to be outputted next is calculated. After the elapse of the calculated time, a multiplied pulse is again outputted. In this manner, until all the R multiplied pulses are outputted, the steps of S560 to S610 are repeated.

When all the R multiplied pulses are outputted (S600: YES), it is determined whether the edge number count value (enc_cnt) at the time is equal to the retained count value (enc_reg), that is, the next encoder edge is supplied before the last multiplied pulse is outputted (S620). At this time, if all the R multiplied pulses are outputted before the next encoder edge is supplied (S620: YES), the process returns to S510 to wait for the next encoder detection. If the next encoder edge is supplied earlier than all the R multiplied pulses are outputted (S620: NO), the edge cycle count value (enc_cyc) at the time (that is, the time elapsed from the detection timing of the earlier encoder edge until output of the $R^{th}$ multiplied pulse) is set as the multiplied cycle count value TT (S630). The process returns to S540.

That is, if the next encoder edge is supplied during generation of all the R multiplied pulses, the edge cycle count value (enc_cyc) at the time is substituted for the multiplied cycle count value TT. Without performing encoder edge detection (S510), multiplied pulse generation is started.

Depending on calculation accuracy of the estimated cycle Te and velocity change of the driven object, it is possible that the next encoder edge may be supplied before the last $R^{th}$ multiplied pulse is outputted. In that case, consideration is given to the time elapsed from the input of the next encoder edge until the output of the $R^{th}$ multiplied pulse by the step of S630, so that the next generation process of new multiplied pulse can be started.

Now, a multiplication pulse generation process executed by the multiplied pulse generator 75 of the reading encoder processor 70 will be explained by way of FIG. 14. In the multiplied pulse generation process of FIG. 14, steps from S710 to S830 (excluding S790) are the same as those from S510 to S620 of FIG. 13. Thus, explanation of the same steps as those in FIG. 13 will not be given. Only the steps that are different from those of FIG. 13 will be described in detail.

Figure 14:
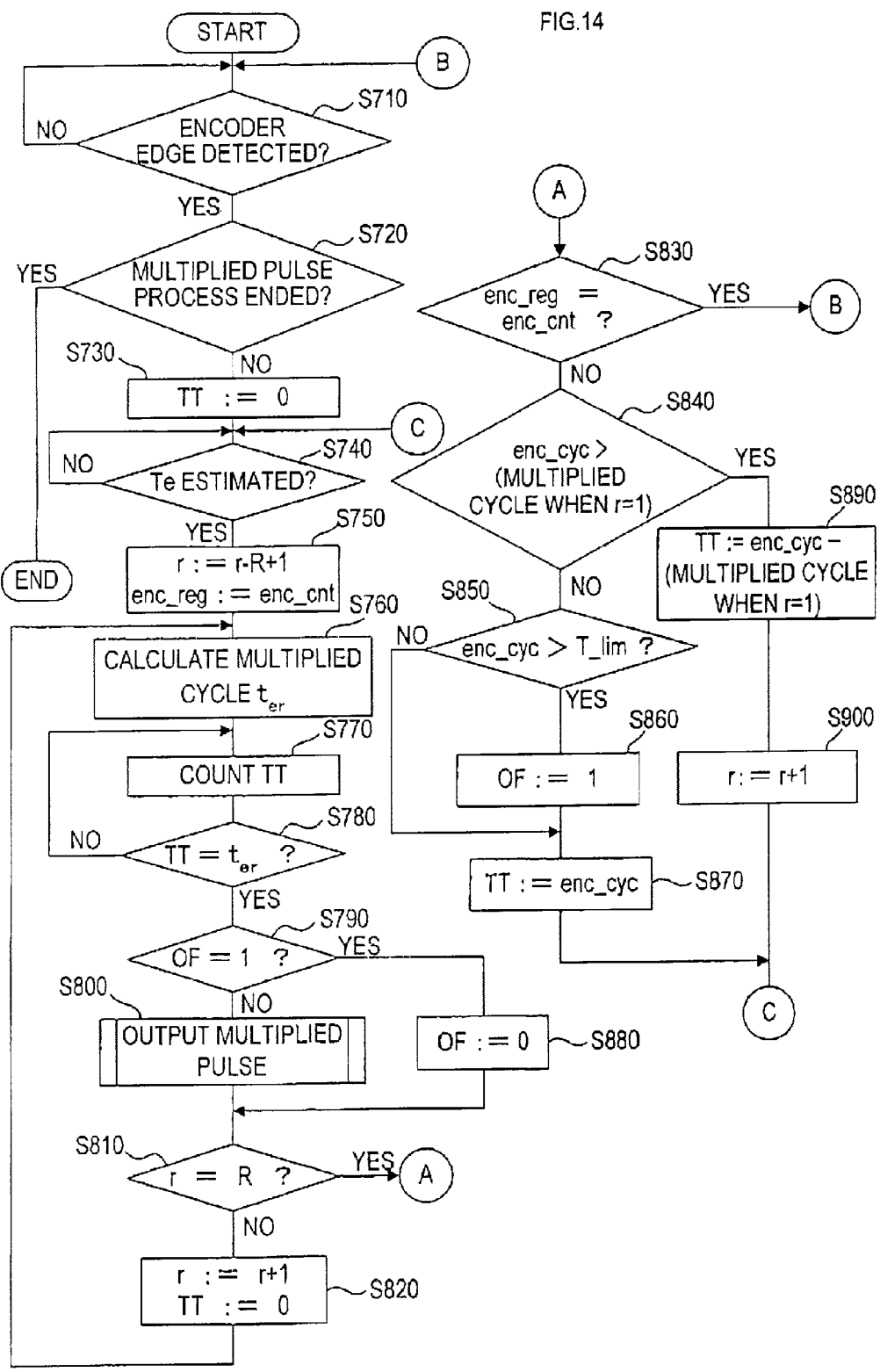
FIG. 14 is a flowchart showing a multiplied pulse generation process executed by a multiplied pulse generator in the reading encoder processor.

In the multiplied pulse generation process of FIG. 14, when the multiplied cycle count value TT reaches the multiplied cycle $t_{er}$ (S780: YES) after calculation of the multiplied cycle $t_{er}$ (S760), it is determined whether 1 is set to the overflag OF (S790) before output of a multiplied pulse. As noted above, the overflag OF is initialized to 0 at first. Thus, when the determination step of S790 is firstly performed, the process inevitably moves to S800. There is output of a multiplied pulse.

On the other hand, when all the R multiplied pulses are outputted and the next encoder edge is already supplied (S830: NO), it is firstly determined in the reading encoder processor 70 whether the edge cycle count value (enc_cyc) at the time exceeds the multiplied cycle of a multiplied pulse to be outputted at first, that is, whether the output timing of the last $R^{th}$ multiplied pulse exceeds the output timing of the first multiplied pulse in the next cycle (S840). In the recording encoder processor 60, as shown in S630 of FIG. 13, the edge cycle count value (enc_cyc) at the time is simply substituted for the multiplied cycle count value TT so as to start generation of multiplied pulses in the next new encoder edge period.

If it is negatively determined in S840 (S840: NO), it is further determined whether the edge cycle count value (enc_cyc) exceeds a predetermined determination value T_lim (S850). If not (S850: NO), the edge cycle count value (enc_cyc) at the time is simply substituted for the multiplied cycle count value TT (S870) so as to start generation of multiplied pulses in the next new encoder edge period (returns to S740). If the edge cycle count value (enc_cyc) exceeds a predetermined determination value T_lim, that is, the output timing of the first multiplied pulse in the next cycle is not yet reached but is coming nearer (S850: YES), 1 is set to the overflag OF. The process moves to the steps of S870 and onwards.

Also, if it is determined in S840 that the edge cycle count value (enc_cyc) at the time exceeds the multiplied cycle of the multiplied pulse to be outputted first, the elapsed time (count value; enc_cyc-(multiplied cycle when r=1)) from the timing when the first multiplied pulse is to be outputted is set to the multiplied cycle count value TT (S890). The output order r is incremented (S900). The process returns to S740.

Thereby, if the last multiplied pulse generated last time has been outputted after encoder edge input and, moreover, the output timing has exceeded the timing of a first multiplied pulse to be outputted in the next encoder period, when generation of multiplied pulses in the next encoder period is started, output of a first multiplied pulse is cancelled and a second multiplied pulse and onwards are outputted since the steps of S890 and S900 have been performed and the output order r have been incremented by 1.

Also, even in case that the last multiplied pulse generated last time has been outputted after input of an encoder edge but the output timing has not yet reached the output timing of the first multiplied pulse in the next encoder period, if the edge cycle count value (enc_cyc) when the last multiplied pulse has been outputted exceeds the above determination value T_lim, '1' is set to the overflag OF by the step of S860. Thus, it is positively determined in the determination step of S790, and the process moves to S810 by way of the step of S880 (clearance of overflag OF). The step of S800, i.e., output of a multiplied pulse, is not performed. In this case as well, output of a first multiplied pulse is canceled, and a second multiplied pulse and onwards are outputted.

When a first multiplied pulse is canceled as such, image data to be read based on the canceled multiplied pulse cannot be obtained. In this case, for example, image data which has been read based on the previous multiplied pulse (that is, the last multiplied pulse in the last actual cycle) may be copied so that the copied image can be handled as image data corresponding to the canceled multiplied pulse. The canceled part of the image may be generated (reproduced), for example, by averaging 2-line image data obtained based on multiplied pulses before and after the canceled multiplied pulse.

(5) Effect of First Embodiment

As noted above, the multi function apparatus 1 of the present embodiment uses a multiplied pulse generated by the recording encoder processor 60 as timing for image forming (ink ejection) by the recording head 15. The multiplied pulse is generated to the number of the predetermined multiplication factor R per encoder edge detection (per output of an edge detection signal). Generation is performed such that the multiplied cycle is linearly (gradually) and smoothly changed based on the multiplied cycle $t_{pR}$ of the last multiplied pulse in the last encoder period and the estimated cycle Te. Particularly, the multiplied cycle $t_{er}$ of the $r^{th}$ multiplied pulse is calculated by equation (1). This means that the driven object reaches the average velocity calculated from the estimated cycle Te just in the middle of the estimated cycle period.

Accordingly, the known problem is restrained in which the cycles of the multiplied pulses are discontinuously changed before and after input of an edge detection signal. Moreover, smooth and reliable multiplied pulses can be generated which have very small error between the driving velocity of the actual driven object and the driving velocity calculated from the multiplied pulse (e.g., multiplied cycle). Since the timing of ink ejection from the recording head 15 is controlled by such smooth and reliable multiplied pulses, high quality can be achieved in image forming.

The multiplied pulse generated by the reading encoder processor 70 is used as timing for image reading by the CIS 33. The multiplied pulse is generated basically in the same manner as the multiplied pulse generated by the recording encoder processor 60. Thus, high quality can be achieved in image reading.

Specifically, in generation of multiplied pulses by the reading encoder processor 70, if output timing of the last ($R^{th}$) multiplied pulse comes after input of the next encoder edge, it is determined whether a first multiplied pulse in the next encoder period is outputted depending on time elapsed from input of the encoder edge. Thus, output timings of the last multiplied pulse and of the first multiplied pulse in the next encoder period are inhibited from being inappropriate (proximate or adverse). Image reading can be performed at more appropriate timing.

Second Embodiment

In the first embodiment, the multiplied cycle of a multiplied pulse is calculated by equation (1). In the present embodiment, the multiplied cycle will be calculated by equation (13) below. The other steps and the apparatus structure are identical to those in the case in the first embodiment.

In the present embodiment, upon generation of a multiplied pulse in the multiplied pulse generator 65 (75), the multiplied cycle $t_{er}$ of the $r^{th}$ multiplied pulse is calculated by equation (13).

$$t_{cr} = \frac{(R-r) \cdot T_p + r \cdot T_c}{R^2}, 1 \le r \le R \quad (13)$$

where r indicates the output order of the multiplied pulse from an encoder edge.

That is, the calculation of S560 in the multiplied pulse generation process of FIG. 13 (the process executed in the multiplied pulse generator 65 of the recording encoder processor 60), and the calculation of S760 in the multiplied pulse generation process of FIG. 14 (the process executed in the multiplied pulse generator 75 of the reading encoder processor 70) are performed by equation (13) above.

Figure 15:
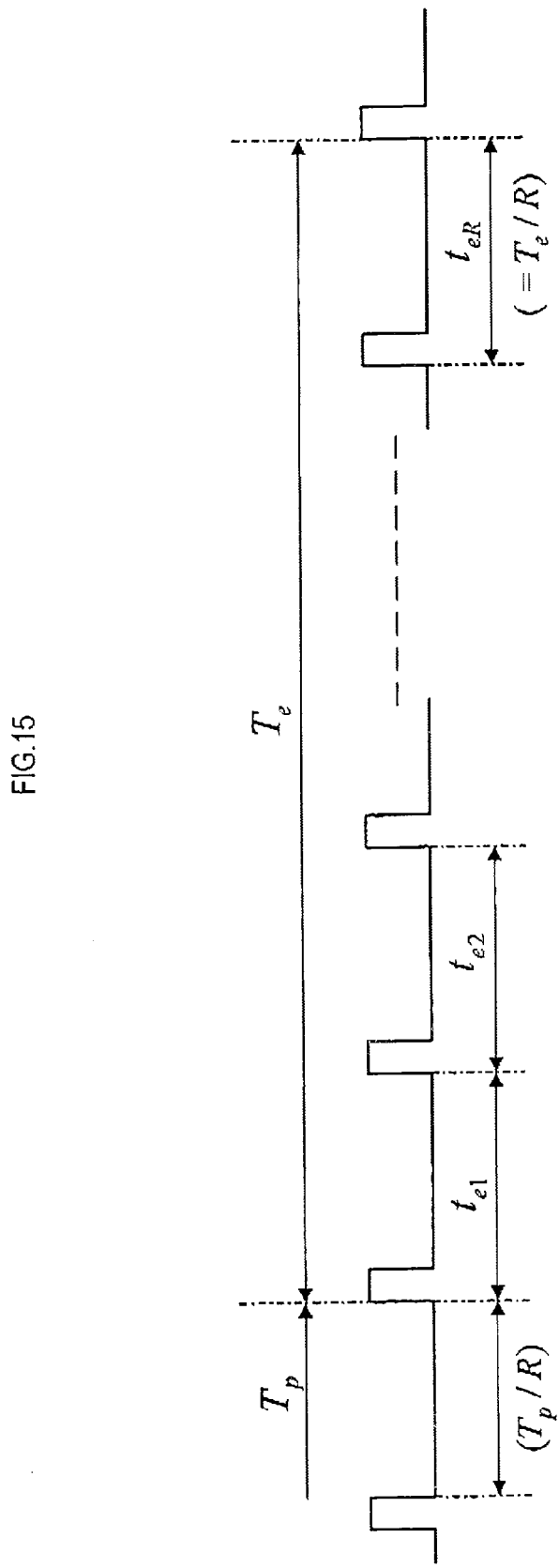
FIG. 15 is an explanatory diagram showing a relationship between each multiplied pulse and an estimated cycle according to a second embodiment.

Now, how equation (13) has been obtained will be explained. As shown in FIG. 15, in the present embodiment as well, when an edge detection signal is outputted, the estimated cycle Te is calculated using equation (9) based on the past m actual cycles including the actual cycle Tp of the last encoder period. Each multiplied cycle $t_{e1}, t_{e2}, \ldots, t_{eR}$ of R multiplied pulses to be generated is calculated based on the estimated cycle Te and the actual cycle Tp of the last encoder period. Particularly, multiplied pulses are generated such that the multiplied cycles of the multiplied pulses are sequentially changed in accordance with the amount of change from the actual cycle Tp to the estimated cycle Te.

In the present embodiment, multiplied pulses are sequentially generated in such a manner that the multiplied cycles are sequentially changed in accordance with the amount of change from the actual cycle Tp to the estimated cycle Te.

If the estimated cycle Te is increased as compared to the actual cycle Tp, the multiplied pulses are generated so that the cycles of the multiplied pulses are sequentially increased. Also, if the estimated cycle Te is decreased as compared to the actual cycle Tp, the multiplied pulses are generated so that the cycles of the multiplied pulses are sequentially decreased. The amount of increase or decrease can be arbitrarily determined. However, the trend of increase or decrease may be the same as that from the actual cycle Tp to the estimated cycle Te. Particularly, in the present embodiment, multiplied pulses are sequentially generated in such a manner that the multiplied cycles are linearly changed in accordance with the amount of change from the actual cycle Tp to the estimated cycle Te.

In addition, in the present embodiment, continuity is retained from the multiplied cycle of the last multiplied pulse generated by the previous edge detection signal to multiplied cycles of multiplied pulses to be generated this time.

Multiplied pulses may be generated in such a manner that the multiplied cycles are gradually changed from the multiplied cycle of the last multiplied pulse generated based on the previous detection signal to the multiplied cycle of the last multiplied pulse to be generated this time.

Particularly, if the amount of change from the actual cycle Tp to the estimated cycle Te is a positive which indicates the trend of increase, the multiplied pulse may be generated such that the multiplied cycle of the first multiplied pulse among the multiplied pulses to be generated this time is at least larger than the multiplied cycle of the last multiplied pulse generated based on the previous detection signal.

If the amount of change from the actual cycle Tp to the estimated cycle Te is a negative which indicates the trend of decrease, the multiplied pulse may be generated such that the multiplied cycle of the first multiplied pulse among the multiplied pulses to be generated this time is at least smaller than the multiplied cycle of the last multiplied pulse generated based on the previous detection signal.

In the present embodiment as shown in FIG. 15, when an edge detection signal is outputted, the multiplied cycle of the last multiplied pulse generated by the previous edge detection signal is assumed as Tp/R. Also, the multiplied cycle $t_{eR}$ of the last multiplied pulse to be generated this time is set as Te/R. Then, multiplied pulses are generated such that the multiplied cycles are linearly changed from Tp/R to Te/R.

Particularly, the multiplied cycle of each multiplied pulse to be generated is assumed as each term of arithmetic progression having Tp/R as the first term and Te/R as the last term.

Based on the above concept, arithmetic expression of the multiplied cycle $t_{er}$ is transformed into a simple linear function expression. Particularly, where an initial value of the multiplied cycle is indicated as b and the slope is indicated as a, the initial value b and the slope a can be expressed by equations (14) and (16), respectively.

$$b = \frac{T_p}{R} \qquad (14)$$

$$a = \frac{\frac{T_c}{R} - \frac{T_p}{R}}{R} = \frac{T_c - T_p}{R^2} \qquad (15)$$

Accordingly, the multiplied cycle $t_{er}$ is calculated as follows.

$$\begin{aligned} t_{cr} &= a \cdot r + b \\ &= \frac{T_c - T_p}{R^2} \cdot r + \frac{T_p}{R} \\ &= \frac{(R-r) \cdot T_p + r \cdot T_c}{R^2} \end{aligned} \qquad (16)$$

Figure 16:
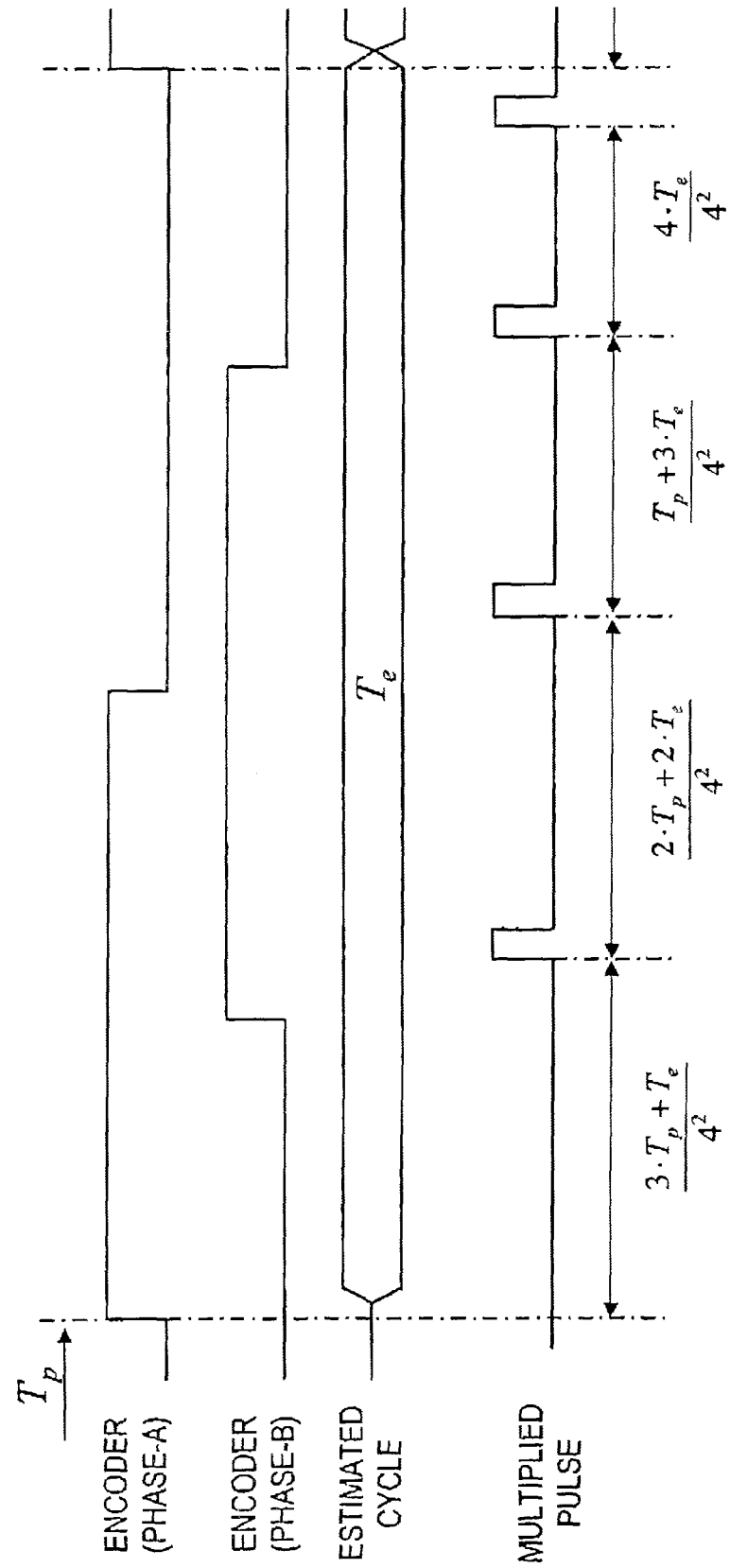
FIG. 16 is an explanatory diagram showing an actual example of the multiplied pulse according to the second embodiment (in the case of four-times multiplication)

FIG. 16 shows an actual example of the multiplied pulses obtained by equation (13) when R=4 (in the case of four-times multiplication). When an edge detection signal is outputted from the encoder edge detector 61 (71) at a leading edge timing of the phase-A signal, the multiplied pulse generator 65 (75) calculates the estimated cycle Te. Multiplied cycles are sequentially calculated by equation (13) to output multiplied pulses. The multiplied cycles of the generated multiplied pulses are changed as shown in FIG. 16.

According to the present embodiment, multiplied pulses are generated such that the multiplied cycles are sequentially changed in accordance with the amount of change from the last actual cycle Tp to the next estimated cycle Te. Discontinuous change of cycles before and after output of an edge detection signal is restrained in multiplied pulses. Therefore, highly reliable multiplied pulses can be obtained.

In case that multiplied pulses are calculated by equation (13), however, the multiplied cycle of the last multiplied pulse in the last period is assumed as the average multiplied cycle Tp/R in the period. Furthermore, the multiplied cycle of the last multiplied pulse to be generated this time is assumed as the average multiplied cycle Te/R based on the estimated cycle Te. That is, the multiplied cycle of the last multiplied pulse is assumed as the average multiplied cycle in the period, to calculate equation (13). Thus, except for time of travel at constant velocity, the sum of the multiplied cycles of the generated multiplied pulses is not consistent with the estimated cycle Te.

Particularly, for example, if the carriage 17 is in acceleration, the sum of the multiplied cycles becomes larger than the estimated cycle Te. To the contrary, if the carriage 17 is in deceleration, the sum of the multiplied cycles becomes smaller than the estimated cycle Te. In the first embodiment, equation (1) is calculated so that the sum of the multiplied cycles is equal to the estimated cycle Te.

Accordingly, in order to obtain high-accuracy multiplied pulses without error, the multiplied pulse generation method of the first embodiment (equation (1)) is more preferable than the multiplied pulse generation method of the present embodiment (equation (13)).

[Variation]

The present invention is not limited to the above described embodiments, and can be practiced in various manners without departing from the technical scope of the invention.

For instance, in the above embodiments, multiplied pulses are generated of which multiplied cycles are changed linearly (linear functionally). However, this is only an example. Multiplied pulses may be generated of which multiplied cycles are changed quadratic or cubic functionally, for example. As long as the multiplied cycles are smoothly changed and the manner of change (increase or decrease) can be the same before and after output of an edge detection signal, various arithmetic expressions are usable.

Also, in the above embodiments, multiplied pulses are generated based on pulse signals from a linear encoder. However, for example, multiplied pulses may be generated based on pulse signal from a rotary encoder. As far as the signal detects the driven amount of the driven object and the signal is outputted each time the driven object is driven by a certain amount, the present invention can be applied based on such detection signal to generate multiplied pulses.

Also, in the above embodiments, the respective processes (FIGS. 10 to 14) are performed based on one of the edge (leading edge of the phase-A signal) of pulse signals having two phases (phase-A and phase-B). However, for example, the above respective processes may be performed based on two edges, that is, both leading and falling edges of the phase-A (or phase-B) signal, or on four edges, that is, both leading and falling edges of the phase-A and phase-B signals.

Particularly, an edge detection signal may be outputted from the encoder edge detector 61 (71) when both leading and falling edges of the phase-A (or phase-B) signal (i.e., two edges) or both leading and falling edges of the phase-A and phase-B signals (i.e., four edges) are detected.

In this case, the respective processes described above are carried out based on the edge detection signal outputted in this manner.

What is claimed is:

1. A multiplied pulse generation device comprising:
   a detection signal output unit that outputs a detection signal every time a driven object is driven by a specific amount;
   an actual cycle measurement unit that measures an actual cycle indicating a time interval between the detection signal and a previous detection signal every time the detection signal is outputted from the detection signal output unit;
   an estimation unit that estimates an estimated cycle indicating a time interval until output of a next detection signal from the detection signal output unit based on at least past two actual cycles every time the detection signal is outputted from the detection signal output unit, the at least past two actual cycles including the actual cycle measured by the actual cycle measurement unit as a result of output of the detection signal; and
   a multiplied pulse generation unit that sequentially generates a multiplied pulse obtained by multiplying the detection signal outputted, by a predetermined multiplication factor, every time the detection signal is outputted from the detection signal output unit, and that sequentially generates the multiplied pulse in such a manner that a multiplied cycle indicating a time interval per which the multiplied pulse is generated is sequentially changed according to an amount of change from the actual cycle measured by the actual cycle measurement unit to the estimated cycle estimated by the estimation unit every time the detection signal is outputted from the detection signal output unit.

2. The multiplied pulse generation device according to claim 1, wherein
the multiplied pulse generation unit sequentially generates the multiplied pulse in such a manner that the multiplied cycle is gradually changed from a multiplied cycle of a last multiplied pulse generated based on the previous detection signal to a multiplied cycle of a last multiplied pulse to be generated this time.

3. The multiplied pulse generation device according to claim 2, wherein
the multiplied pulse generation unit generates the multiplied pulse such that a multiplied cycle of a first multiplied pulse among multiplied pulses to be generated this time is at least larger than the multiplied cycle of the last multiplied pulse generated based on the previous detection signal if the amount of change from the actual cycle to the estimated cycle is a positive, while
the multiplied pulse generation unit generates the multiplied pulse such that such that the multiplied cycle of the first multiplied pulse among the multiplied pulses to be generated this time is at least smaller than the multiplied cycle of the last multiplied pulse generated based on the previous detection signal if the amount of change from the actual cycle to the estimated cycle is a negative.

4. The multiplied pulse generation device according to claim 1, wherein
the multiplied pulse generation unit generates the multiplied pulse such that the multiplied cycle is linearly changed.

5. The multiplied pulse generation device according to claim 1, wherein
the multiplied pulse generation unit assumes a multiplied cycle of a last multiplied pulse generated based on the previous detection signal as Tp/R (Tp: actual cycle measured by the actual cycle measurement unit, R: multiplication factor), and a multiplied cycle of a last multiplied pulse to be generated this time as Te/R (Te: estimated cycle estimated by the estimation unit) when the detection signal is outputted by the detection signal output unit, so that multiplied pulses are generated of which multiplied cycles are sequentially changed from Tp/R to Te/R.

6. The multiplied pulse generation device according to claim 5, wherein
the multiplied pulse generation unit generates the multiplied pulse, assuming the multiplied cycle of each of the multiplied pulse to be generated is assumed as each term of arithmetic progression having Tp/R as a first term and Te/R as a last term.

7. A multiplied pulse generation device comprising:
a detection signal output unit that outputs a detection signal every time a driven object is driven by a specific amount;
an actual cycle measurement unit that measures an actual cycle indicating a time interval between the detection signal and a previous detection signal every time the detection signal is outputted from the detection signal output unit;
an estimation unit that estimates an estimated cycle indicating a time interval until output of a next detection signal from the detection signal output unit based on at least past two actual cycles every time the detection signal is outputted from the detection signal output unit, the at least past two actual cycles including the actual cycle measured by the actual cycle measurement unit as a result of output of the detection signal; and
a multiplied pulse generation unit that sequentially generates a multiplied pulse obtained by multiplying the detection signal outputted, by a predetermined multiplication factor, every time the detection signal is outputted from the detection signal output unit, and that sequentially generates the multiplied pulse in such a manner that a multiplied cycle indicating a time interval per which the multiplied pulse is generated is gradually changed from a multiplied cycle of a last multiplied pulse generated based on the previous detection signal to a multiplied cycle of a last multiplied pulse to be generated this time, and that a sum of multiplied cycles of multiplied pulses to be generated is consistent with the estimated cycle.

8. The multiplied pulse generation device according to claim 7, wherein
gradual change of the multiplied cycle from the multiplied cycle of the last multiplied pulse generated based on the previous detection signal to the multiplied cycle of the last multiplied pulse to be generated this time includes cases in which:
the multiplied cycle is sequentially increased from the multiplied cycle of the last multiplied pulse generated based on the previous detection signal to the multiplied cycle of the last multiplied pulse to be generated this time;
the multiplied cycle is sequentially decreased from the multiplied cycle of the last multiplied pulse generated based on the previous detection signal to the multiplied cycle of the last multiplied pulse to be generated this time; and
the multiplied cycle is constant from the multiplied cycle of the last multiplied pulse generated based on the previous detection signal to the multiplied cycle of the last multiplied pulse to be generated this time.

9. The multiplied pulse generation device according to claim 7, wherein
the multiplied pulse generation unit generates the multiplied pulse such that the multiplied cycle is linearly changed.

10. The multiplied pulse generation device according to claim 9, wherein
the multiplied pulse generation unit generates the multiplied pulse, assuming the multiplied cycle of each of the multiplied pulse to be generated as each term of arithmetic progression having the multiplied cycle of the last multiplied pulse generated based on the previous detection signal as a first term and the multiplied cycle of the last multiplied pulse among multiplied pulses to be generated this time as a last term.

11. The multiplied pulse generation device according to claim 1, wherein
the multiplied pulse generation unit includes
a detection signal determination unit that determines whether a next detection signal has already been outputted from the detection signal output unit when a last multiplied pulse to be generated is generated,
an overtime measurement unit that measures overtime which is time from when the next detection signal is outputted until the last multiplied pulse is generated, and
an excess amount determination unit that determines whether the overtime measured by the overtime measurement unit exceeds a predetermined excess amount determination value,
wherein a first multiplied pulse to be generated in response to output of the next detection signal is not generated when it is determined that the overtime measured by the overtime measurement unit exceeds the predetermined excess amount determination value by the excess amount determination unit.

12. The multiplied pulse generation device according to claim 11, wherein
the excess amount determination value is a multiplied cycle of the first multiplied pulse to be generated as a result of output of the next detection signal.

13. The multiplied pulse generation device according to claim 1, wherein
the detection signal output unit is an optical encoder.

14. A multiplied pulse generation method comprising the steps of:
outputting a detection signal every time a driven object is driven by a specific amount;
measuring an actual cycle indicating a time interval between the detection signal and a previous detection signal every time the detection signal is outputted;
estimating an estimated cycle indicating a time interval until output of a next detection signal based on at least past two actual cycles every time the detection signal is outputted, the at least past two actual cycles including the actual cycle measured as a result of output of the detection signal; and
sequentially generating a multiplied pulse obtained by multiplying the detection signal outputted, by a predetermined multiplication factor, every time the detection signal is outputted, and sequentially generating the multiplied pulse in such a manner that a multiplied cycle indicating a time interval per which the multiplied pulse is generated is sequentially changed according to an amount of change from the actual cycle measured, to the estimated cycle every time the detection signal is outputted.

15. A multiplied pulse generation method comprising the steps of:
outputting a detection signal every time a driven object is driven by a specific amount;
measuring an actual cycle indicating a time interval between the detection signal and a previous detection signal every time the detection signal is outputted;
estimating an estimated cycle indicating a time interval until output of a next detection signal based on at least past two actual cycles every time the detection signal is outputted, the at least past two actual cycles including the actual cycle measured as a result of output of the detection signal; and
sequentially generating a multiplied pulse obtained by multiplying the detection signal outputted, by a predetermined multiplication factor, every time the detection signal is outputted, and sequentially generating the multiplied pulse in such a manner that a multiplied cycle indicating a time interval per which the multiplied pulse is generated is gradually changed from a multiplied cycle of a last multiplied pulse generated based on the previous detection signal to a multiplied cycle of a last multiplied pulse to be generated this time, and that a sum of multiplied cycles of multiplied pulses to be generated is consistent with the estimated cycle.

16. An image forming apparatus comprising:
a recording head that forms an image onto a recording medium by ejecting ink;
a recording controller that controls ejection timing of ink from the recording head;
a carriage that mounts the recording head as the driven object thereon;
a carriage mover that reciprocates the carriage in a main scanning direction corresponding to an image forming direction; and
the multiplied pulse generation device set forth in claim 1, wherein the recording controller uses the multiplied pulse generated by the multiplied pulse generation unit as the ejection timing during a move of the carriage by the carriage mover.

17. An image forming apparatus comprising:
a recording head that forms an image onto a recording medium by ejecting ink;
a recording controller that controls ejection timing of ink from the recording head;
a carriage that mounts the recording head as the driven object thereon;
a carriage mover that reciprocates the carriage in a main scanning direction corresponding to an image forming direction; and
the multiplied pulse generation device set forth in claim 7, wherein the recording controller uses the multiplied pulse generated by the multiplied pulse generation unit as the ejection timing during a move of the carriage by the carriage mover.

18. An image reading apparatus comprising:
an image reader that reads an image formed on a document;
a reading controller that controls reading timing of the image by the image reader;
an image reader mover that moves the image reader in a main scanning direction corresponding to an image reading direction; and
the multiplied pulse generation device set forth in claim 1, wherein the reading controller uses the multiplied pulse generated by the multiplied pulse generation unit as the reading timing during a move of the image reader by the image reader mover.

19. An image reading apparatus comprising:
an image reader that reads an image formed on a document;
a reading controller that controls reading timing of the image by the image reader;
an image reader mover that moves the image reader in a main scanning direction corresponding to an image reading direction; and
the multiplied pulse generation device set forth in claim 7, wherein the reading controller uses the multiplied pulse generated by the multiplied pulse generation unit as the reading timing during a move of the image reader by the image reader mover.

* * * * *